United States Patent
Dalum

(10) Patent No.: US 10,427,520 B2
(45) Date of Patent: Oct. 1, 2019

(54) HYBRID VEHICLE DRIVE SYSTEM AND METHOD USING SPLIT SHAFT POWER TAKE OFF

(71) Applicant: Power Technology Holdings LLC, Pewaukee, WI (US)

(72) Inventor: Joseph Thomas Dalum, Delafield, WI (US)

(73) Assignee: Power Technology Holdings LLC, Pewaukee, WI (US)

( * ) Notice: Subject to any disclaimer, the term of this patent is extended or adjusted under 35 U.S.C. 154(b) by 0 days.

(21) Appl. No.: 15/883,067

(22) Filed: Jan. 29, 2018

(65) Prior Publication Data

US 2018/0154773 A1 Jun. 7, 2018

Related U.S. Application Data

(63) Continuation of application No. 14/547,025, filed on Nov. 18, 2014, now Pat. No. 9,878,616.

(60) Provisional application No. 61/905,705, filed on Nov. 18, 2013.

(51) Int. Cl.
- *B60K 25/00* (2006.01)
- *B60K 17/28* (2006.01)
- *B60K 6/00* (2006.01)
- *B60K 25/06* (2006.01)

(52) U.S. Cl.
CPC .............. *B60K 25/00* (2013.01); *B60K 6/00* (2013.01); *B60K 17/28* (2013.01); *B60K 25/06* (2013.01); *B60K 2025/005* (2013.01); *B60Y 2200/14* (2013.01); *B60Y 2200/221* (2013.01); *B60Y 2200/412* (2013.01); *B60Y 2200/415* (2013.01); *Y10S 903/904* (2013.01)

(58) Field of Classification Search
None
See application file for complete search history.

(56) References Cited

U.S. PATENT DOCUMENTS

| | | | |
|---|---|---|---|
| 2,581,010 A | 1/1952 | Findley et al. | |
| 2,968,915 A | 1/1961 | Feistel, Jr. | |
| 3,299,983 A | 1/1967 | Hubbard | |
| 3,493,066 A * | 2/1970 | Dooley | B60K 6/105 |
| | | | 180/165 |

(Continued)

FOREIGN PATENT DOCUMENTS

| | | |
|---|---|---|
| CN | 1647968 | 8/2005 |
| CN | 101011964 | 8/2007 |

(Continued)

OTHER PUBLICATIONS

U.S. Notice of Allowance on U.S. Appl. No. 15/067,419 dated May 7, 2018, 5 pps.

(Continued)

*Primary Examiner* — Nicole T Verley
(74) *Attorney, Agent, or Firm* — Foley & Lardner LLP

(57) ABSTRACT

A hybrid vehicle drive system for use with a first prime mover and a transmission driven by the first prime mover. The system includes a second prime mover coupled to a rechargeable energy source, a split shaft PTO, and an accessory coupled to the split shaft PTO. The split shaft PTO is configured to couple to the second prime mover, and the accessory is configured to receive power from the second prime mover through the split shaft PTO.

13 Claims, 14 Drawing Sheets

(56) References Cited

U.S. PATENT DOCUMENTS

| | | |
|---|---|---|
| 3,923,115 A | 12/1975 | Helling |
| 4,443,752 A | 4/1984 | Newman |
| 4,588,040 A | 5/1986 | Albright et al. |
| 4,671,577 A | 6/1987 | Woods |
| 4,676,116 A | 6/1987 | Nerstad et al. |
| 4,918,690 A | 4/1990 | Markkula et al. |
| 4,941,143 A | 7/1990 | Twitty et al. |
| 4,948,050 A | 8/1990 | Picot |
| 4,955,018 A | 9/1990 | Twitty et al. |
| 4,959,962 A | 10/1990 | Hagin et al. |
| 4,962,462 A | 10/1990 | Fekete |
| 4,969,147 A | 11/1990 | Markkula et al. |
| 4,993,780 A | 2/1991 | Tanaka et al. |
| 5,190,118 A | 3/1993 | Yelton |
| 5,195,600 A | 3/1993 | Dorgan |
| 5,242,278 A | 9/1993 | Vanderslice et al. |
| 5,297,143 A | 3/1994 | Fridrich et al. |
| 5,315,227 A | 5/1994 | Pierson et al. |
| 5,318,142 A | 6/1994 | Bates et al. |
| 5,319,641 A | 6/1994 | Fridrich et al. |
| 5,366,827 A | 11/1994 | Belanger et al. |
| 5,373,198 A | 12/1994 | Lopez Jimenez |
| 5,394,089 A | 2/1995 | Clegg |
| 5,420,572 A | 5/1995 | Dolin et al. |
| 5,492,189 A | 2/1996 | Kriegler et al. |
| 5,495,912 A | 3/1996 | Gray et al. |
| 5,500,852 A | 3/1996 | Riley |
| 5,513,324 A | 4/1996 | Dolin et al. |
| 5,519,878 A | 5/1996 | Dolin, Jr. |
| 5,558,588 A | 9/1996 | Schmidt |
| 5,568,037 A | 10/1996 | Massaroni et al. |
| 5,569,552 A | 10/1996 | Rao et al. |
| 5,620,057 A | 4/1997 | Klemen et al. |
| 5,625,272 A | 4/1997 | Takahashi |
| 5,635,805 A | 6/1997 | Ibaraki et al. |
| 5,669,842 A * | 9/1997 | Schmidt ............... B60K 6/365 180/65.25 |
| 5,701,068 A | 12/1997 | Baer et al. |
| 5,806,617 A | 9/1998 | Yamaguchi |
| 5,866,276 A | 2/1999 | Ogami et al. |
| 5,867,009 A | 2/1999 | Kiuchi et al. |
| 5,887,674 A | 3/1999 | Gray, Jr. |
| 5,892,346 A | 4/1999 | Moroto et al. |
| 5,923,093 A | 7/1999 | Tabata et al. |
| 5,934,396 A | 8/1999 | Kurita |
| 5,985,483 A | 11/1999 | Verhoog et al. |
| 6,022,292 A | 2/2000 | Goodnight |
| 6,037,749 A | 3/2000 | Parsonage |
| 6,042,961 A | 3/2000 | Verhoog et al. |
| 6,048,288 A | 4/2000 | Tsujii et al. |
| 6,057,050 A | 5/2000 | Parise |
| 6,165,102 A | 12/2000 | Bellinger |
| 6,179,395 B1 | 1/2001 | Schneider |
| 6,198,387 B1 | 3/2001 | Dalum et al. |
| 6,220,733 B1 | 4/2001 | Gordon |
| 6,251,042 B1 | 6/2001 | Peterson et al. |
| 6,269,895 B1 | 8/2001 | Tanuguchi et al. |
| 6,316,841 B1 | 11/2001 | Weber |
| 6,386,303 B1 | 5/2002 | Zibuschka et al. |
| 6,395,417 B1 | 5/2002 | Frazier |
| 6,456,041 B1 | 9/2002 | Terada et al. |
| 6,484,830 B1 | 11/2002 | Gruenwald et al. |
| 6,502,393 B1 | 1/2003 | Stephenson et al. |
| 6,511,399 B2 | 1/2003 | Mc Collum Etchason et al. |
| 6,518,732 B2 | 2/2003 | Palanisamy |
| 6,524,084 B2 | 2/2003 | Neumair |
| 6,524,743 B2 | 2/2003 | Vackar |
| 6,579,642 B2 | 6/2003 | Yamane et al. |
| 6,590,363 B2 | 7/2003 | Teramoto |
| 6,598,496 B2 | 7/2003 | Pannell |
| 6,617,826 B2 | 9/2003 | Liao et al. |
| 6,651,759 B1 | 11/2003 | Gruenwald et al. |
| 6,653,002 B1 | 11/2003 | Parise |
| 6,658,852 B2 | 12/2003 | Frey |
| 6,666,022 B1 | 12/2003 | Yoshimatsu et al. |
| 6,672,415 B1 | 1/2004 | Tabata |
| 6,692,395 B2 | 2/2004 | Rodeghiero et al. |
| 6,705,416 B1 | 3/2004 | Glonner et al. |
| 6,708,787 B2 | 3/2004 | Naruse et al. |
| 6,718,782 B2 | 4/2004 | Egami |
| 6,719,080 B1 | 4/2004 | Gray, Jr. |
| 6,724,165 B2 | 4/2004 | Hughes |
| 6,725,581 B2 | 4/2004 | Naruse et al. |
| 6,751,960 B2 | 6/2004 | Arimitsu |
| 6,798,165 B2 | 9/2004 | Cartwright et al. |
| 6,834,737 B2 | 12/2004 | Bloxham |
| 6,880,651 B2 | 4/2005 | Loh et al. |
| 6,882,129 B2 | 4/2005 | Boskovitch et al. |
| 6,885,920 B2 | 4/2005 | Yakes et al. |
| 6,907,948 B2 | 6/2005 | Wakashiro et al. |
| 6,922,990 B2 | 8/2005 | Naruse et al. |
| 6,945,039 B2 | 9/2005 | Yoshino |
| 6,945,893 B2 | 9/2005 | Grillo et al. |
| 6,962,093 B2 | 11/2005 | Warner |
| 6,969,921 B2 | 11/2005 | Yoshimatsu |
| 7,004,273 B1 | 2/2006 | Gruenwald et al. |
| 7,017,348 B2 | 3/2006 | Tajima et al. |
| 7,086,226 B2 | 8/2006 | Oguri |
| 7,093,912 B2 | 8/2006 | Brown et al. |
| 7,096,985 B2 | 8/2006 | Charaudeau et al. |
| 7,104,920 B2 | 9/2006 | Beaty et al. |
| 7,119,454 B1 | 10/2006 | Chiao |
| 7,125,357 B2 | 10/2006 | Porter |
| 7,146,960 B2 | 12/2006 | Phlips et al. |
| 7,147,071 B2 | 12/2006 | Gering et al. |
| 7,182,583 B2 | 2/2007 | Gandrud et al. |
| 7,185,722 B1 | 3/2007 | Sakamoto et al. |
| 7,190,133 B2 | 3/2007 | King et al. |
| 7,207,404 B2 | 4/2007 | Ito et al. |
| 7,207,916 B2 | 4/2007 | Rodeghiero et al. |
| 7,219,000 B2 | 5/2007 | Steinmetz et al. |
| 7,251,265 B2 | 7/2007 | Yakymyshyn et al. |
| 7,252,165 B1 | 8/2007 | Gruenwald et al. |
| 7,258,183 B2 | 8/2007 | Leonardi et al. |
| 7,273,122 B2 | 9/2007 | Rose |
| 7,275,917 B1 | 10/2007 | Hicks |
| 7,277,782 B2 | 10/2007 | Yakes et al. |
| 7,281,770 B1 | 10/2007 | Curran et al. |
| 7,293,621 B2 | 11/2007 | Long |
| 7,298,102 B2 | 11/2007 | Sopko et al. |
| 7,315,090 B2 | 1/2008 | Yang |
| 7,343,897 B2 * | 3/2008 | Katrak ............... B60K 25/00 123/350 |
| 7,345,441 B2 | 3/2008 | Yoshimatsu |
| 7,375,492 B2 | 5/2008 | Calhoon et al. |
| 7,391,129 B2 | 6/2008 | Chiao et al. |
| 7,399,255 B1 | 7/2008 | Johnson et al. |
| 7,427,156 B2 | 9/2008 | Ambrosio et al. |
| 7,448,981 B2 | 11/2008 | Mashiki |
| 7,471,066 B2 | 12/2008 | Ambrosio et al. |
| 7,487,023 B2 | 2/2009 | Komiyama et al. |
| 7,520,354 B2 | 4/2009 | Morrow et al. |
| 7,575,287 B2 | 8/2009 | Matsuura et al. |
| 7,580,779 B2 | 8/2009 | Zillmer et al. |
| 7,597,172 B1 | 10/2009 | Kovach et al. |
| 7,600,595 B2 | 10/2009 | Harris |
| 7,610,976 B2 | 11/2009 | Holmes et al. |
| 7,641,018 B2 * | 1/2010 | Bissontz ............... B60K 6/48 180/306 |
| 7,654,620 B2 | 2/2010 | Jeon et al. |
| 7,657,350 B2 | 2/2010 | Moran |
| 7,658,250 B2 | 2/2010 | Betz et al. |
| 7,662,062 B2 | 2/2010 | Yang |
| 7,665,559 B2 | 2/2010 | De La Torre-Bueno |
| 7,669,414 B2 * | 3/2010 | Loeffler ............... B60K 6/12 60/414 |
| 7,670,253 B2 | 3/2010 | Sah |
| 7,683,569 B2 | 3/2010 | Bloomfield |
| 7,689,331 B2 | 3/2010 | Moran |
| 7,719,232 B2 | 5/2010 | Kelty et al. |
| 7,728,449 B2 | 6/2010 | Kagoshima et al. |
| 7,806,801 B2 | 10/2010 | Gohring et al. |
| 7,841,432 B2 | 11/2010 | Lynn et al. |
| 7,854,282 B2 | 12/2010 | Lee et al. |

(56) References Cited

U.S. PATENT DOCUMENTS

| | | | |
|---|---|---|---|
| 7,859,202 B2 | 12/2010 | Lukic et al. | |
| 7,900,724 B2 | 3/2011 | Promersberger et al. | |
| 7,914,924 B2 | 3/2011 | Sugeno et al. | |
| 7,921,950 B2 | 4/2011 | Harris | |
| 7,954,581 B2 | 6/2011 | Tanishima | |
| 7,994,221 B2 | 8/2011 | Dai et al. | |
| 8,115,450 B2 | 2/2012 | Ambrosio et al. | |
| 8,118,005 B2* | 2/2012 | Bradley | F02N 7/10 123/179.19 |
| 8,186,465 B2 | 5/2012 | Oyobe et al. | |
| 8,190,318 B2 | 5/2012 | Li et al. | |
| 8,210,293 B2 | 7/2012 | Ang et al. | |
| 8,229,611 B2 | 7/2012 | Yamada | |
| 8,275,528 B2 | 9/2012 | Kresse | |
| 8,408,341 B2* | 4/2013 | Dalum | B60W 20/10 180/65.22 |
| 8,608,607 B2 | 12/2013 | Kandeth | |
| 8,612,076 B2 | 12/2013 | Maini et al. | |
| 8,672,066 B2* | 3/2014 | Momal | B60K 6/38 180/53.5 |
| 8,818,588 B2* | 8/2014 | Ambrosio | B60K 6/48 180/65.21 |
| 8,978,798 B2* | 3/2015 | Dalum | B60K 6/12 180/65.22 |
| 9,315,187 B2* | 4/2016 | Stenson | B60W 20/10 |
| 9,751,518 B2* | 9/2017 | Dalum | B60W 20/10 |
| 2001/0035740 A1 | 11/2001 | Palanisamy | |
| 2002/0028376 A1 | 3/2002 | Yamane et al. | |
| 2002/0104300 A1 | 8/2002 | Hunt | |
| 2002/0108794 A1 | 8/2002 | Wakashiro et al. | |
| 2002/0167221 A1 | 11/2002 | Kosik et al. | |
| 2003/0062205 A1 | 4/2003 | Konrad et al. | |
| 2003/0103850 A1 | 6/2003 | Szulczewski | |
| 2003/0145666 A1 | 8/2003 | Warner | |
| 2003/0162631 A1 | 8/2003 | Williams | |
| 2003/0169002 A1 | 9/2003 | Hughes | |
| 2004/0108831 A1 | 6/2004 | Cartwright et al. | |
| 2004/0207205 A1 | 10/2004 | Kikuchi et al. | |
| 2004/0207350 A1 | 10/2004 | Wilton et al. | |
| 2004/0251065 A1 | 12/2004 | Komiyama et al. | |
| 2005/0012337 A1 | 1/2005 | Yoshimatsu | |
| 2005/0082098 A1 | 4/2005 | Ito et al. | |
| 2005/0139399 A1 | 6/2005 | Gopal | |
| 2005/0167169 A1 | 8/2005 | Gering et al. | |
| 2005/0202315 A1 | 9/2005 | Sugeno et al. | |
| 2005/0271934 A1 | 12/2005 | Kiger et al. | |
| 2006/0052215 A1 | 3/2006 | Beaty et al. | |
| 2006/0068970 A1 | 3/2006 | Rose | |
| 2006/0102137 A1 | 5/2006 | Phlips et al. | |
| 2006/0116797 A1 | 6/2006 | Moran | |
| 2007/0001616 A1 | 1/2007 | Puccetti et al. | |
| 2007/0095587 A1 | 5/2007 | Ducharme | |
| 2007/0096667 A1 | 5/2007 | Komiyama et al. | |
| 2007/0107958 A1 | 5/2007 | Oliver | |
| 2007/0108838 A1 | 5/2007 | Shaffer et al. | |
| 2007/0124037 A1 | 5/2007 | Moran | |
| 2007/0158118 A1 | 7/2007 | King | |
| 2007/0181355 A1 | 8/2007 | Harris | |
| 2007/0207894 A1 | 9/2007 | Prebeck | |
| 2007/0209850 A1 | 9/2007 | Bloomfield | |
| 2007/0227801 A1 | 10/2007 | Loeffler | |
| 2007/0246274 A1 | 10/2007 | Dreibholz et al. | |
| 2007/0278022 A1 | 12/2007 | Tanishima | |
| 2008/0071472 A1 | 3/2008 | Yamada | |
| 2008/0093143 A1 | 4/2008 | Harrison | |
| 2008/0093864 A1 | 4/2008 | Kagoshima et al. | |
| 2008/0141800 A1 | 6/2008 | Seitz et al. | |
| 2008/0227589 A1 | 9/2008 | Zillmer et al. | |
| 2008/0234097 A1 | 9/2008 | Sah | |
| 2008/0243324 A1* | 10/2008 | Harris | B60K 6/48 701/22 |
| 2008/0264189 A1 | 10/2008 | Hancock | |
| 2008/0288132 A1 | 11/2008 | King et al. | |
| 2009/0018716 A1 | 1/2009 | Ambrosio | |
| 2009/0068547 A1 | 3/2009 | Ambrosio et al. | |
| 2009/0095549 A1* | 4/2009 | Dalum | B60K 6/12 180/65.265 |
| 2009/0096424 A1 | 4/2009 | Ambrosio et al. | |
| 2009/0236156 A1 | 9/2009 | Promersberger et al. | |
| 2009/0259355 A1 | 10/2009 | Li | |
| 2009/0259363 A1 | 10/2009 | Li et al. | |
| 2010/0057281 A1 | 3/2010 | Lawyer et al. | |
| 2010/0065358 A1 | 3/2010 | Harris | |
| 2010/0219007 A1* | 9/2010 | Dalum | B60W 20/10 180/65.22 |
| 2011/0022259 A1 | 1/2011 | Niwa | |
| 2011/0190968 A1 | 8/2011 | Fleming et al. | |
| 2011/0306455 A1 | 12/2011 | Kandeth | |
| 2012/0207620 A1* | 8/2012 | Dalum | B60K 6/12 417/44.1 |
| 2012/0266701 A1 | 10/2012 | Yamada et al. | |
| 2013/0280110 A1 | 10/2013 | Gutjahr et al. | |

FOREIGN PATENT DOCUMENTS

| | | |
|---|---|---|
| CN | 101052542 A | 10/2007 |
| CN | 101795884 A | 8/2010 |
| CN | 102470751 | 5/2012 |
| CN | 102991329 | 3/2013 |
| CN | 103287260 | 9/2013 |
| DE | 27 01 301 | 7/1978 |
| DE | 40 24 384 A1 | 2/1992 |
| DE | 41 02 822 | 8/1992 |
| DE | 41 02 882 A1 | 8/1992 |
| DE | 42 04 384 A | 8/1993 |
| DE | 19748423 | 2/1999 |
| DE | 10203514 | 8/2003 |
| DE | 10 2007 016 514 A1 | 10/2008 |
| EP | 0 492 152 | 7/1992 |
| EP | 2 055 548 | 5/2009 |
| EP | 2551140 A1 | 1/2013 |
| JP | 08-308020 | 11/1996 |
| JP | 08-322107 A | 12/1996 |
| JP | 09-163616 | 6/1997 |
| JP | 10-037904 | 2/1998 |
| JP | H10-037904 | 2/1998 |
| JP | H11-069509 A | 3/1999 |
| JP | H11-115743 | 4/1999 |
| JP | H11-069509 A | 9/1999 |
| JP | 2000-115912 | 4/2000 |
| JP | 2000-156917 A | 6/2000 |
| JP | 2000-170888 | 6/2000 |
| JP | 2000-287307 A | 10/2000 |
| JP | 2001-008309 | 1/2001 |
| JP | 2001-008309 A0 | 1/2001 |
| JP | 2001-112117 A | 4/2001 |
| JP | 2001-254643 | 9/2001 |
| JP | 2002-046507 A | 2/2002 |
| JP | 2002-171601 A | 6/2002 |
| JP | 2003-191762 A | 7/2003 |
| JP | 2003-232412 A | 8/2003 |
| JP | 2004-006136 A | 1/2004 |
| JP | 2004-100504 A | 4/2004 |
| JP | 2004-166363 A | 6/2004 |
| JP | 2004-254402 A | 9/2004 |
| JP | 2005-102492 A | 4/2005 |
| JP | 2005-351381 A | 12/2005 |
| JP | 2007-068358 A | 3/2007 |
| JP | 2007-069788 | 3/2007 |
| JP | 2007-089262 A | 4/2007 |
| JP | 2007-106385 | 4/2007 |
| JP | 2007-107231 | 4/2007 |
| JP | 2007-177694 A | 7/2007 |
| JP | 2007-177694 A1 | 7/2007 |
| JP | 2009-292287 A | 12/2009 |
| JP | 2009-292287 A1 | 12/2009 |
| JP | 2011-501714 A | 1/2011 |
| JP | 2011-525448 A | 9/2011 |
| WO | WO-92/01584 | 2/1992 |
| WO | WO-2007/097819 | 8/2007 |
| WO | WO-2009/009078 A1 | 1/2009 |

(56) References Cited

FOREIGN PATENT DOCUMENTS

| WO | WO-2009/049066 A2 | 4/2009 |
|---|---|---|
| WO | WO-2009/088406 A2 | 7/2009 |
| WO | WO-2009/117574 A1 | 9/2009 |

OTHER PUBLICATIONS

Final Office Action on U.S. Appl. No. 14/640,818 dated Jun. 11, 2018, 16 pps.
Requirement for Restriction/Election on U.S. Appl. No. 15/694,551 dated Jun. 25, 2018, 11 pps.
U.S. Appl. No. 60/959,191, filed Jul. 12, 2007, Ambrosio et al.
AZD, Azure Dynamics, Force Drive Electric Solutions, Force Drive Electric Vehicles Zero Emissions, http://www.azuredynamics.com/products/force-drive/traction-motors.htm; retrieved on Sep. 17, 2008, 2 pages.Sep. 17, 2008; 2 pgs.
AZD, Azure Dynamics, LEEP, Low Emission Electric Power System, AZD Has One of the Largest Hybrid Technology Engineering Teams in the World; available at least by May 30, 2008, 2 pages.
AZD, Azure Dynamics, Parallel Hybrid Electric Ford E450 Cutaway and Strip Chassis, available at least by May 30, 2008, 2 pages.
AZD, Azure Dynamics, Series Hybrid Electric Azure CitiBus, Our drive can make your difference; available at least by May 30, 2008; 2 pgs.
Balance Hybrid Electric E450 Drive System Hybrid Trucks, http://www.azuredynamics.com/products/balance-hybrid-electric.htm; retrieved on Sep. 17, 2008, 2 pages.
Blanco, Odyne, Dueco Will Build PHV Aerial Lift Truck, http://autobloggreen.com/2007/05/07/odyne-dueco-will-build-phev-aerial-lift-truck/, retrieved on on Jan. 3, 2009, 6 pages.
Burke, A Deep Impression, Technology of Clean Air, Diesel Progress North American Edition, Jul. 2013, 3 pages.
Cai, Integrated Starter Alternator, Automotive Power Electronics and Motor Drives, 2005, 55 pages.
Chinese Office Action for Application No. 200880105323.X, dated May 9, 2012, 7 pages.
CitiBus Hybrid Electric StarTrans, CitiBus HD Senator, http://www.azuredynamics.com/products/citibus-hybrid-electric.htm; retrieved on Sep. 17, 2008, 2 pages.
Communication and Supplementary European Search Report for Application No. EP08794431, dated May 24, 2011, 7 pgs.
Computer Translation of Foreign Patent Document DE 40 24 384 A1, 14 pages.
Decision of Refusal for Japanese Application No. JP2015-055558, dated Nov. 1, 2016, 8 pages.
Dueco, Hybrid Vehicle, TL50M Dueco's Plug-In Hybrid Electric Vehicle (PHEV), www.dueco.com, available at least by May 30, 2008, 1 page.
Dueco/Odyne Corporation, Partners in Green Technology for the Utility Industry, Hybrid Power, PHEV-Diesel Electric, www.dueco.com, available at least by May 30, 2008, 1 page.
Eaton, Freightliner LLC, Daimler Chrysler Truck Group, M2 Proof of Concept HEV Utility Truck Specs; available at least by May 30, 2008, 2 pages.
Eaton, Hybrid Power Systems, Roadranger, Eaton's Medium-Duty Hybrid Electric System Provides Up to 60% Fuel Savings and Significantly Reduces Emissions as Compared to a Conventional Drivetrain, www.roadranger.com., 2006, 2 pages.
Electric Hybrid, www.eaton.com/Eaton, ProductsServices/Truck/HybridPower/SystemsOveriview/El . . . , retrieved on Oct. 25, 2013, 1 page.
English Translation of Chinese Office Action and Search Report for Application No. 2008801170943, dated Apr. 11, 2013, 14 pages.
English Translation of Office Action for Chinese Application No. 2008801170943, dated Nov. 26, 2013, 2 pages.
Ex Parte Quayle Action on U.S. Appl. No. 14/563,878 dated Nov. 21, 2016, 5 pages.
Ex Parte Quayle Office Action on U.S. Appl. No. 14/547,025, dated Jun. 14, 2016, 7 pages.

Examination Report of India Application No. 3118DELNP2010, dated May 9, 2017, 7 pages.
Final Notice of Rejection on Japanese Patent Application No. 2014-544723, dated Oct. 4, 2016,6 pages.
Final Office Action for Korean Patent Application No. 10-2010-7010085, dated Aug. 28, 2015, 6 pages.
Final Office Action on U.S. Appl. No. 13/397,561 dated Nov. 5, 2014, 8 pages.
Final Office Action on U.S. Appl. No. 13/812,723 dated Nov. 5, 2014, 14 pages.
Final Office Action on U.S. Appl. No. 14/283,185, dated Mar. 13, 2017, 11 pages.
Final Office Action on U.S. Appl. No. 14/640,818, dated Mar. 24, 2017, 16 pages.
First Office Action and Search Report for Chinese Application No. 201280058943.9 dated Jan. 22, 2016, 7 pages.
First Office Action and Search Report of Chinese Application No. 2015100698003, dated Sep. 18, 2016, 8 pages.
First Office Action and Search Report on Chinese Patent Application No. 201410058501.5 dated Jul. 24, 2015, 15 pages.
First Office Action on Korean Patent Application 10-2010-7010085, dated Dec. 17, 2014, 8 pages.
Fourth Office Action with English Translation in Chinese Patent Application No. 200880117094, dated Jun. 4, 2014, 7 pages.
Green Car Congress, Nissan Adds Diesel Hybrid and CNG Models to Atlas H43 Lineup, http://www.greencarcongress.com/2007/09/nissan-adds-die.html; retrieved on Jun. 23, 2009, 2 pages.
Hodges, Is There a Hybrid in Your Future?, http://www.lmtruck.com/articles/petemplate.aspx?storyid=116, retrieved on Jun. 6, 2008, 6 pages.
Hybrid Electric Vehicles LEEP Systems/Azure Dynamics, LEEP Systems/Freeze/Lift, http://www.azuredynamics.com/products/leep-system.htm, retrieved on Sep. 17, 2008, 1 page.
HyPower by Terex, Low Carbon Footprint, Plug-In Power Hybrid System, 2009, 2 pages.
Integrated Motor Assist (IMA), http://wikicars.org/es/Integrated_Motor_Assist_(IMA), retrieved on Apr. 19, 2013, 7 pages.
Integrated Motor Assist, http://en.wikipedia.org/wiki/Integrated_Motor_Assist, retrieved on Oct. 7, 2013, 3 pages.
International Preliminary Report on Patentability for PCT Application No. PCT/US2012/029835, dated Jun. 3, 2014, 5 pages.
International Preliminary Report on Patentability received in PCT Application No. PCT/US2013/036431, dated Oct. 14, 2014, 6 pages.
International Search Report and Written Opinion for International Appl. No. PCT/US2008/079376, dated Apr. 9, 2009, 9 pgs.
International Search Report and Written Opinion for International Application No. PCT/US08/08442, dated Sep. 26, 2008, 7 pages.
International Search Report and Written Opinion for International Application No. PCT/US2009/037664, dated Aug. 3, 2009, 9 pages.
International Search Report and Written Opinion for PCT/US2009/066151 dated Jul. 15, 2010, 10 pages.
International Search Report and Written Opinion received in PCT Application No. PCT/US2014/066223, dated Feb. 24, 2015, 11 pages.
International Search Report and Written Opinion regarding PCT/US2012/029835, dated Dec. 26, 2012, 7 pages.
International Search Report and Written Report for Application No. PCT/US2013/036431, dated Jul. 23, 2013, 12 pages.
Invitation pursuant to Article 94(3) and Rule 71(1) EPC of EPO Application No. 08837311.3, dated Mar. 8, 2017, 5 pages.
Isuzu ELF Diesel Hybrid description from Isuzu.com—different pages of complete report retrieved from web.archieve.org on various dates such as May 9, 2006, Sep. 5, 2006, Oct. 31, 2006 for the pages included with the Office Action for U.S. Appl. No. 12/130,888, 6 pages.
Isuzu, Introduction of ELF Diesel Hybrid, http://www.isuzu.co.jp/world/technology/randd/project6/01.html, retrieved on Nov. 1, 2007, 2 pages.
Isuzu, Low Pollution Alternative Fuel Vehicles, http://www.isuzu.co.jp/world/technology/low/index.html, retrieved on Jun. 22, 2009, 3 pages.

(56) References Cited

OTHER PUBLICATIONS

Japanese Office Action regarding Application No. 2010-516050, dated Oct. 9, 2012, 1 pages.
Li et al., Power Management System for Plug-In Hybrid Electric Vehicles, 2012, 2 pages.
Li, Trip Based Optimal Power Management for Plug-In Hybrid Electric Vehicles, OTT ID #1127, Mar. 9, 2012, 20 pages.
Non-Final Office Action on U.S. Appl. No. 14/745,232, dated Jan. 20, 2016, 11 pages.
Notice of Allowance for U.S. Appl. 13/629,533 dated Jul. 30, 2014, 7 pages.
Notice of Allowance for U.S. Appl. No. 11/312,803, dated Jun. 2, 2008, 7 pages.
Notice of Allowance for U.S. Appl. No. 11/315,927, dated Sep. 29, 2008, 7 pages.
Notice of Allowance for U.S. Appl. No. 11/322,024, dated Nov. 15, 2007, 6 pages.
Notice of Allowance for U.S. Appl. No. 11/329,018, dated Jun. 25, 2010, 7 pages.
Notice of Allowance for U.S. Appl. No. 12/130,888 dated Oct. 17, 2014, 7 pages.
Notice of Allowance for U.S. Appl. No. 12/284,612, dated Sep. 30, 2011, 8 pages.
Notice of Allowance for U.S. Appl. No. 12/710,247, dated Nov. 26, 2012, 8 pages.
Notice of Allowance for U.S. Appl. No. 14/563,878, dated Apr. 4, 2017, 6 pages.
Notice of Allowance for U.S. Appl. No. 14/563,878, dated Jul. 19, 2017, 4 pages.
Notice of Allowance for U.S. Appl. No. 14/745,232, dated Jan. 5, 2017, 6 pages.
Notice of Allowance for U.S. Appl. No. 14/547,025 dated Sep. 19, 2017. 11 pages.
Notice of Allowance on U.S. Appl. No. 13/812,723, dated Oct. 15, 2015, 5 pages.
Notice of Allowance on U.S. Appl. No. 12/217,407 dated Mar. 27, 2014, 10 pages.
Notice of Allowance on U.S. Appl. No. 14/081,892 dated Feb. 3, 2015, 6 pages.
Odyne Corp. Receives Order for Twenty-Five Plug-In Hybrid Systems from Dueco, Inc., http://www.businesswire.com/portal/site/home/index.jsp?epi_menuItemID=887566059a3ae . . . , retrieved on Jan. 3, 2008, 3 pages.
Office Action for European Application No. 08794431.0, dated Oct. 29, 2012, 4 pages.
Office Action for European Application No. 08837311.3, dated Jan. 9, 2013, 6 pages.
Office Action for Japanese Application No. 2010-516050, dated Nov. 5, 2013, 6 pages.
Office Action for Japanese Application No. 2010-529046, dated Dec. 10, 2013.
Office Action for Japanese Application No. 2010-529046, dated Mar. 12, 2013, 2 pages.
Office Action for U.S. Appl. No. 11/312,803, dated Dec. 14, 2007, 8 pages.
Office Action for U.S. Appl. No. 11/315,927, dated Aug. 19, 2008, 15 pages.
Office Action for U.S. Appl. No. 11/315,927, dated Nov. 21, 2007, 19 pages.
Office Action for U.S. Appl. No. 11/322,024, dated May 29, 2007, 9 pages.
Office Action for U.S. Appl. No. 11/329,018, dated Dec. 18, 2009, 13 pages.
Office Action for U.S. Appl. No. 11/329,018, dated Jun. 25, 2009, 16 pages.
Office Action for U.S. Appl. No. 12/130,888, dated Jun. 26, 2013, 15 pages.
Office Action for U.S. Appl. No. 12/130,888, dated Mar. 27, 2012, 18 pages.
Office Action for U.S. Appl. No. 12/217,407, dated Dec. 5, 2011, 10 pages.
Office Action for U.S. Appl. No. 12/217,407, dated Feb. 5, 2013, 10 pages.
Office Action for U.S. Appl. No. 12/217,407, dated Jun. 21, 2011, 10 pages.
Office Action for U.S. Appl. No. 12/217,407, dated Jun. 6, 2012, 8 pages.
Office Action for U.S. Appl. No. 12/217,407, dated Oct. 22, 2013, 10 pages.
Office Action for U.S. Appl. No. 12/284,612, dated Mar. 16, 2011, 11 pages.
Office Action for U.S. Appl. No. 12/316,494, dated Dec. 1, 2009, 15 pages.
Office Action for U.S. Appl. No. 12/316,494, dated Jun. 9, 2009, 17 pages.
Office Action for U.S. Appl. No. 12/710,247, dated Apr. 10, 2012, 17 pages.
Office Action for U.S. Appl. No. 12/710,247, dated Aug. 27, 2012, 5 pages.
Office Action for U.S. Appl. No. 13/629,533, dated Jun. 5, 2013, 9 pages.
Office Action for U.S. Appl. No. 13/629,533, dated Nov. 6, 2013, 7 pages.
Office Action for U.S. Appl. No. 13/812,723, dated Sep. 4, 2013, 11 pages.
Office Action on Canadian Patent Application 2,702,089, dated Nov. 4, 2014, 3 pages.
Office Action on Canadian Patent Application No. 2,693,536, dated Aug. 26, 2014, 2 pages.
Office Action on Japanese Application No. 2014-080127, dated Jun. 23, 2015, 4 pages.
Office Action on Japanese Application No. 2015-055558, dated Dec. 16, 2015, (translated), 5 pages.
Office Action on Japanese Patent Application 2010-516050, dated Nov. 25, 2014, 6 pages.
Office Action on Japanese Patent Application No. 2014-544723, dated Nov. 4, 2015, 13 pages.
Office Action on U.S. Appl. No. 12/130,888 dated Feb. 19, 2014, 16 pages.
Office Action on U.S. Appl. No. 13/397561 dated Mar. 19, 2014, 9 pages.
Office Action on U.S. Appl. No. 13/629,533 dated May 21, 2014, 16 pages.
Office Action on U.S. Appl. No. 13/812,723 dated Feb. 26, 2014, 8 pages.
Office Action on U.S. Appl. No. 13/812,723 dated Jun. 19, 2014, 13 pages.
Office Action on U.S. Appl. No. 13/812,723 dated May 22, 2015, 19 pages.
Office Action on U.S. Appl. No. 14/081,892 dated Jun. 4, 2014, 11 pages.
Office Action on U.S. Appl. No. 14/081,892 dated Oct. 21, 2014, 12 pages.
Ogando, Hydraulic Powertrains Propel These Hybrid Trucks; http://www.designnews.com/article/CA6451735.html?nid=2874#_self; Jun. 13, 2007; 5 pages.
Palumbo et al., Ultracapacitor Based Hybrid Booster Drive®, Jun. 2004, 16 pages.
Partial Supplementary European Search Report of EPO Application No. 13774990.9, dated May 26, 2017, 10 pages.
Powderly, Odyne to Ship 25 Plug-In Systems to Dueco Inc., http://www.libn.com/breakingnews.htm?articleID=9497, Dec. 20, 2007, 2 pages.
Requisition for Canadian Patent Application No. 2,751,753, dated Nov. 19, 2015, 5 pages.
Restriction Requirement for U.S. Appl. No. 13/629,533, dated Feb. 28, 2013, 8 pages.
Second Office Action in Chinese Patent Application No. 200880117094 with English Translation, dated Jun. 4, 2014, 4 pages.
Second Office Action of Chinese Application No. 201280058943.9, dated Nov. 17, 2016, 1 page.

(56) References Cited

OTHER PUBLICATIONS

Second Office Action of Chinese Application No. 201380028536.8, dated May 15, 2017, 8 pages.
Second Office Action of Chinese Application No. 201380028536.8, dated May 15, 2017, 9 pages.
Second Office Action of Chinese Application No. 201510069800, dated Jun. 21, 2017, 7 pages.
Sherosky, Stop-Start Technology Especially Challenging for Micro-Hybrid Engineers, Torque News, Jan. 28, 2011, 3 pages.
Supplementary European Search Report and Search Opinion for European Application No. 08837311, dated Sep. 20, 2011, 9 pages.
Supplementary European Search Report for Application No. 08794431.0, dated May 24, 2011, 7 pages.
Supplementary European Search Report for European Patent Application No. 08837311.3, dated Sep. 1, 2011, 8 pages.
Third Office Action for Chinese Application No. 200880105323.X, dated Jul. 26, 2013, 4 pages.
Third Office Action of Chinese Application No. 201280058943., dated Jun. 8, 2017, 7 pages.
Third Office Action of Chinese Application No. 201280058943., dated Jun. 8, 2017, 3 pages.
ThomasNet, Aerial Lift Truck Delivers Plug-In Hybrid Functionality, http://news.thomasnet.com/fullstory/535299, retrieved on Jan. 3, 2008, 4 pages.
U.S. Notice of Allowance on U.S. Appl. No. 14/547,025 dated Dec. 22, 2017.
U.S. Office Action on U.S. Appl. No. 15/067,419 dated Jan. 12, 2018.
Vasilash, Power Trains 2005, Hybrid Powertrains: The Two-mode Approach, http://www.autofieldguide.com/articles/article_print1.cfm, retrieved on Jun. 24, 2009, 3 pages.
Vehicle Technology.org, Advanced GM Allison Two-Mode Parallel Hybrid Technology Ready for Europe, Energy Storage System (ESS), http://www.vehicletecnology.org/vt2007/38.html, retrieved on Jun. 22, 2009, 3 pages.
Vehicle Technology.org, Advanced GM Allison Two-mode Parallel Hybrid Technology Ready for Europe, http://www.vehicletecnology.org/vt2007/36.html, retrieved on Jun. 6, 2008, 2 pages.
English translation of Second Chinese Office Action regarding Application No. 201480071944.6, dated Aug. 13, 2018, 5 pps.
Final Office Action regarding U.S. Appl. No. 14/283,185 dated Sep. 21, 2018, 14 pps.
Non-Final Office Action on U.S. Appl. No. 14/640,818 dated May 2, 2019.
Non-Final Office Action on U.S. Appl. No. 14/283,185 dated Jun. 28, 2019.
U.S. Appl. No. 60/959,181, dated Jul. 12, 2007, Ambrosio et al.
2012 Honda Civic Hybrid v. 2011 Toyota Prius Five Comparison Test, www.edmunds.com/toyota/prius/2011/comparison-test.html, retrieved on Apr. 19, 2013, 9 pages.
AZD, Azure Dynamics, Electric Drive Solutions, AZD Force Drive, We Drive a World of Difference; available at least by May 30, 2008, 2 pages.

* cited by examiner

HYBRID VEHICLE DRIVE SYSTEM AND METHOD USING SPLIT SHAFT POWER TAKE OFF

CROSS-REFERENCE TO RELATED PATENT APPLICATIONS

This application is a continuation of U.S. patent application Ser. No. 14/547,025, filed Nov. 18, 2014, which claims the benefit of priority under 35 U.S.C. § 119(e) to U.S. Provisional Application No. 61/905,705 filed Nov. 18, 2013 (096637-0152), which:
- relates to U.S. application Ser. No. 13/812,723 filed Mar. 20, 2012 which claims priority to PCT/US2012/029835, which claims priority to 61/566,526, filed Dec. 2, 2011; U.S. application Ser. No. 14/081,892, filed Nov. 15, 2013 (096637-0151) which claims priority to PCT/US2013/036431 filed Apr. 12, 2013, which claims priority to U.S. Provisional Application No. 61/624,118, filed May 13, 2012; and U.S. application Ser. No. 13/629,533 filed Sep. 27, 2012 which is a divisional of U.S. Pat. No. 8,408,341, filed Feb. 22, 2010, which:
    - is a continuation-in-part of U.S. patent application Ser. No. 12/130,888, filed May 30, 2008, which claims the benefit of priority under 35 U.S.C. § 119(e) to U.S. Provisional Application No. 60/979,755, filed Oct. 12, 2007, and U.S. Provisional Application No. 61/014,406, filed Dec. 17, 2007;
    - is a continuation-in-part of U.S. patent application Ser. No. 12/217,407, filed Jul. 3, 2008, which claims the benefit of priority under 35 U.S.C. § 119(e) to U.S. Provisional Application No. 60/959,181, filed Jul. 12, 2007, and U.S. Provisional Application No. 61/126,118, filed May 1, 2008;
    - is a continuation-in-part of PCT/US2009/066151, filed Nov. 30, 2009, which claims the benefit of priority to U.S. Provisional Application No. 61/177,240, filed May 11, 2009, and U.S. Provisional Application No. 61/118,980, filed Dec. 1, 2008, and U.S. Provisional Application No. 61/235,998, filed Aug. 21, 2009, and U.S. Provisional Application No. 61/251,285, filed Oct. 13, 2009;
    - is a continuation-in-part of PCT/US2008/008442, filed Jul. 10, 2008;
    - is a continuation-in-part of PCT/US2008/079376, filed Oct. 9, 2008, which is a continuation of U.S. application Ser. No. 12/130,888, filed on May 30, 2008, which claims the benefit of priority to U.S. Provisional Application No. 60/979,755, filed on Oct. 12, 2007, and U.S. Provisional Application No. 61/014,406, filed on Dec. 17, 2007.

Each of the above applications is incorporated herein by reference in its entirety.

BACKGROUND

The present disclosure relates to vehicle drive systems. More particularly, the present disclosure relates to hybrid vehicle drive systems employing electric and hydraulic components.

Hybrid vehicle drive systems can employ at least two prime movers arranged in different configurations relative to a transmission. One known configuration is found in so-called "series-parallel" hybrids. "Series-parallel" hybrids are arranged such that multiple prime movers can power the drive shaft alone or in conjunction with one another.

A hybrid vehicle drive system can include a first and second prime mover (e.g., an internal combustion engine and an electric motor/generator) arranged in a parallel configuration and used to provide power to a drive shaft and a power take-off (PTO) shaft through a transmission. PTO shafts are generally used to drive auxiliary systems, accessories, or other machinery (e.g., pumps, mixers, barrels, winches, blowers, etc.). One limitation of this system is that the second prime mover is typically positioned between the first prime mover and the transmission, creating the need to reposition existing drive train components.

A hybrid vehicle drive system can also include a first prime mover (e.g., an internal combustion engine) that drives a PTO through a transmission. A second prime mover (e.g., electric motor/generator) can be coupled directly to the PTO. The applications incorporated herein by reference have described hybrid drive systems that also include an accessory such as a fluid motor/pump. Space required for the electric motor and hydraulic motor/pump can be limited. In addition, shafts, linkages, and couplings for attaching the fluid pumps/motor, the electric motor/generator, and the PTO can take additional space and require clearance that affects the placement of other vehicle components.

A hybrid system can also include a PTO mounted to a transmission that is coupled to a through shaft electric motor that is coupled to an end mount hydraulic motor. A hybrid system can also include a PTO mounted to a transmission that is coupled to an accessory with a through shaft. The accessory can be a hydraulic pump. The accessory is coupled to an end mount electric motor. One disadvantage of both designs described above is the need for a component with a through shaft. Electric motors with a through shaft are typically more difficult to procure, and when directly coupled to a PTO, often rotate at a speed relatively close to that of the first prime mover. The speed of rotation of the first prime mover is often not at the speed of rotation needed by an electric motor for optimal efficiency.

Another disadvantage of using an electric motor with a through shaft occurs if the motor is a permanent magnet electric machine and there is a fault in the hybrid system, such as a short or open circuit. In such situation, the electric motor may not be able to be rotated due to the existence of an electrical shock hazard, causing the accessory coupled to the electric motor to be completely inoperative. In the case of the hydraulic pump with a through shaft, it is often very difficult to install the hybrid drive system unless a functioning hydraulic system is installed at the same time, since the hydraulic pump must rotate to couple the electric motor to the transmission through the PTO. Rotating a hydraulic pump without fluid may cause severe damage to the pump. Mounting the hydraulic pump in between the electric motor and the PTO also causes the system to rotate the pump even if hydraulic flow is not needed by equipment, typically creating unwanted parasitic energy losses for the hybrid system. To minimize parasitic losses, a pump or hydraulic system may have to be modified so that the hydraulic pump can be uncoupled from the transmission during driving of the vehicle, causing additional expense.

Therefore, a need exists for hybrid system or vehicle idle reduction system in which the electric motor can be installed before the accessory is installed, that can accept a more common end mount electric motor, that can allow the electric motor to rotate at a significantly higher speed than the first prime mover, that is modular and easy to install, that can be installed external to the transmission, that can optionally uncouple the accessory when it is not needed, that allows for lower cost accessories to be utilized, while still providing propulsion, and that can rotate the accessory and uncouple the electric motor, if the electric motor has a fault. Also, a need exists for a hybrid vehicle drive system and method of operating a hybrid vehicle drive system that allows a drive shaft to receive power from at least three components. There is also a need for a hybrid vehicle drive system that allows for the prevention of friction and wear by disengaging unused components. There is also a need to overcome disadvantages associated with a split shaft PTO used from a drive axle, including stationary only use, locked wheels, and the need to connect with another PTO instead of the drive shaft to the wheels. There is a further need for a hybrid vehicle drive system that uses a compact structure including a PTO, electric motor, and a fluid pump. Still further, there is a need for a PTO-based hybrid system that can be easily retrofitted and includes a fluid pump/motor and an electric motor/generator. Further still, there is a need for a hybrid PTO system with a fluid pump/motor and electric motor/generator optimized for use with a vehicle, such as a boom truck.

SUMMARY

One embodiment relates to a hybrid vehicle drive system for a vehicle including a first prime mover and a transmission driven by the first prime mover. The hybrid vehicle drive system further includes a second prime mover, a split shaft PTO, and an accessory. The second prime mover can be coupled to a rechargeable energy source. The split shaft PTO can be configured to couple to the second prime mover. The accessory can be coupled to the split shaft PTO and can be configured to receive power from the second prime mover through the split shaft PTO.

An exemplary embodiment relates to a vehicle drive system for a vehicle including a first prime mover, a first prime mover driven transmission, and a rechargeable energy source. The vehicle drive system includes a split shaft PTO, an electric motor, and a fluid motor in direct or indirect mechanical communication with the split shaft PTO. The split shaft PTO is configured to receive power from a number of components and transfer power to a number of components. The electric motor can be in direct or indirect mechanical communication with the first prime mover driven transmission through the split shaft PTO and can receive power from the first prime mover driven transmission via the split shaft PTO.

In some embodiments, the electric motor can embody the features above without having to sever the driveline. The electric motor can also embody the features while the vehicle is in motion or while the vehicle is stationary with the driveline intact. The fluid motor can be powered by rotation of the electric motor via the split shaft PTO. The electric motor can be rotated using power from the rechargeable energy source or the fluid motor can be rotated using power from the first prime mover via the split shaft PTO, in some embodiments.

In yet another embodiment, the hybrid system includes a second prime mover mounted behind the first prime mover driven transmission. This configuration can be referred to as a post transmission hybrid. A post transmission hybrid typically has a the driveline between the transmission and the rear differential (rear axle) of the vehicle to be severed. The second prime mover is either a hydraulic or an electrical motor with a through shaft, in which the remaining sections of the drive shaft are coupled. One disadvantage of the post transmission hybrid is that additional expense is typically required to sever the existing driveline and install the second prime mover. The second prime mover rotation is limited to that of the driveline and may often not be in an optimal range of rpm (revolution per minute) for efficient use of the second prime mover. Another disadvantage is that a vehicle mounted accessory, such as a hydraulic pump or air compressor for operation of equipment or performance of work at a job site cannot be run from the second prime mover, since the vehicle drive shaft must be kept stationary when the vehicle is at rest at a job site, in certain embodiments.

A split shaft power take-off may be used to provide power from a transmission to vehicle mounted accessories, such as a hydraulic pump used to power equipment or pump fluids, such as water, in some embodiments. The split shaft PTO also is mounted behind the transmission and requires the driveshaft between the transmission and the rear differential (rear axle) to be severed and the split shaft PTO to be mounted between the halves of the driveshaft, in some embodiments. When the prime mover is needed to power equipment, the vehicle is brought to a rest and the split shaft mechanism is operated to uncouple the driveshaft from the vehicle and allow power from the rear of the transmission to power the accessory without moving the vehicle. One disadvantage of the through shaft PTO being used behind the transmission is the additional modifications needed to the driveline, including expense in modification and the possibility that the failure of the through shaft PTO could cause the vehicle to be disabled, and unable to provide propulsion. Another disadvantage is that the through shaft PTO mounted behind the rear axle must be built to transmit the full torque of the drive shaft, even if the accessory does not require as much torque. Both disadvantages increase cost of the through shaft PTO in comparison to other options, such as a transmission mounted PTO.

Another exemplary embodiment relates to a method of using a vehicle with a hybrid vehicle drive system. The vehicle includes a first prime mover, an electric motor, a first rechargeable energy source, and a first prime mover driven transmission. The method can include using the electric motor coupled to a split shaft PTO to charge the first rechargeable energy source in a first mode via the first prime mover through the split shaft PTO. The method can further include using the electric motor to drive an accessory via the split shaft PTO using energy from the first rechargeable energy source in a second mode. The method also can include using the first prime mover to drive the accessory via the split shaft PTO in a third mode.

BRIEF DESCRIPTION OF THE DRAWINGS

Embodiments will be described with reference to the accompanying drawings, wherein like reference numerals denote like elements.

DETAILED DESCRIPTION

Figure 1A:
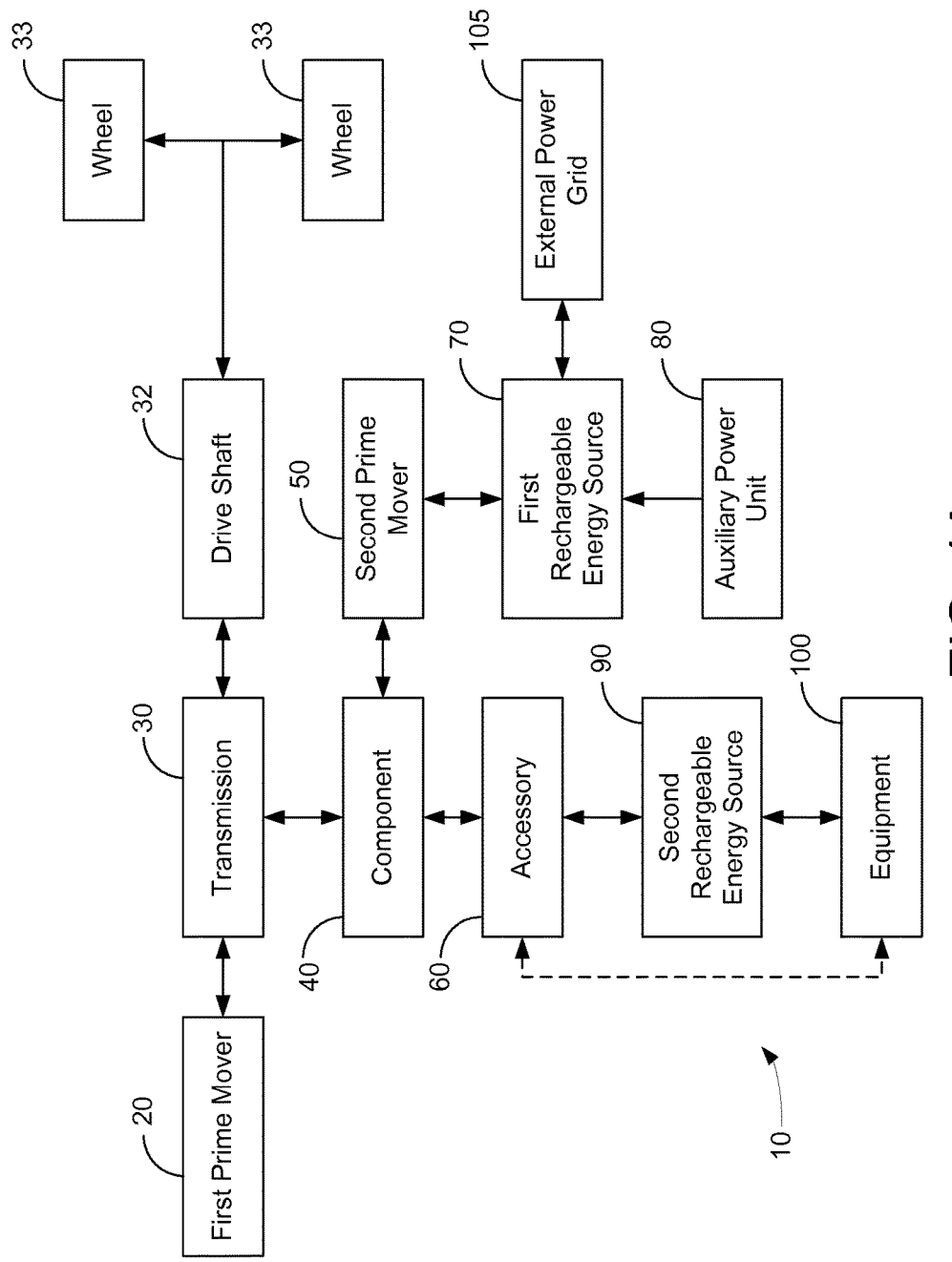
FIG. 1A is a general block diagram of a hybrid vehicle drive system using a split shaft component architecture illustrating paths of possible power sources for the drive shaft according to an exemplary embodiment.

Hybrid vehicle drive systems according to several possible embodiments are presented. One feature of one exemplary embodiment of the hybrid vehicle drive system is that an accessory can be powered singly or in any combination by a first prime mover, and a second prime mover via a split shaft PTO or a gearbox. In some embodiments, the system is used without the need to sever a driveshaft between the rear of a transmission and the rear differential of a vehicle (rear axle). Some embodiments incorporate hydraulic systems into the hybrid vehicle drive system for optimal energy storage and usage. It is noted that the term motor as used herein refers to an electric motor/generator, a motor, a generator fluid motor, a pump or compressor, or a fluid motor/pump, and is not limited to a device that performs motor operations.

Another feature of one exemplary embodiment of the system is that when a power take-off (PTO) configured to be engaged or disengaged while a transmission is moving is used, any unneeded drive system components other than a first prime mover can be entirely disconnected from the drive train, reducing inefficiencies and wear in situations where the different portions of the system do not need to interact, such as when a drive shaft is solely driven by the first prime mover, or when a vehicle using the system is stationary and a second prime mover and accessory are not being driven by the first prime mover. Similarly, an optional clutch between the first prime mover 20 and the transmission 30 (clutch 165 in FIG. 6) or an optional clutch associated with the PTO can be used to reduce inefficiencies during regenerative braking by removing first prime mover 20 from system 10 when vehicle braking occurs. An optional clutch between the first prime mover 20 and the transmission 30 (or a clutch embedded in transmission 30 that performs the same function) may also be used to optionally disconnect first prime mover 20 to allow second prime mover, or other movers, to more easily move drive shaft and/or vehicle without use of prime mover 20. Such operation may require auxiliary components and systems (such as power steering, HVAC, braking system, etc.) to receive power from other sources when prime mover 20 is off. In some embodiments, the PTO interfaces with the transmission, allowing the transmission to multiply the torque of the second prime mover when powering a driveshaft and rear axle(s), in comparison to the post transmission hybrid that does not benefit from the gearing of the transmission and must operate over a broader rpm range.

Yet another feature of one exemplary embodiment of the system is that the accessory (e.g., hydraulic pump, pneumatic pump, air compressor, hydraulic motor, electric motor, air conditioning compressor, etc.) can be powered singly or in any combination by the first prime mover, the second prime mover, energy from braking, or energy stored in a second rechargeable energy source (e.g., battery, ultra capacitor, hydraulic accumulator, etc.). The presence of a second rechargeable energy source also can obviate the need for a complicated pump control system when the accessory is a hydraulic pump, particularly, in one example, if the second rechargeable energy source is used as an energy source for equipment that draws power from the source, (e.g., such as hydraulically powered equipment connected to a hydraulic accumulator or air tools connected to a pressurized air tank). If the pump is a variable volume displacement pump, further simplification is possible because a clutch may not be needed between the second prime mover and the pump in one embodiment. Other types of pumps can also be used. According to one exemplary embodiment, with a clutch between the second prime mover and the hydraulic pump, the pump can be an inexpensive gear pump, compressor for an air conditioning system, or compressor for other gases, such as air. Alternatively, the accessory might be an additional electric motor used to generate three phase power.

Yet another feature of one exemplary embodiment of the system is that a first rechargeable energy source connected to the second prime mover can be recharged in one or more modes. These modes include: the second prime mover using power from the first prime mover; the second prime mover using power from regenerative braking; the accessory, using energy stored in the second rechargeable energy source to operate the second prime mover; an auxiliary power unit connected to the first rechargeable energy source; an engine alternator, when present (the alternator can be increased in capacity to allow for this additional charge while driving or idle); or from an external power source, such as being directly plugged into an external power grid. The use of one or more of the modes is optional in some embodiments. The second prime mover can draw upon this power stored in the first rechargeable power source before daily operation of the vehicle (e.g., after overnight charging), when the vehicle is stopped, or in other situations. In such situations, the second prime mover would operate the accessory to pre-charge or pressurize the optional second rechargeable energy source before the energy is needed, which would provide higher density power storage when the second rechargeable power source is a hydraulic accumulator, among other advantages. A higher density energy storage device is intended to provide more available power at low revolutions per minute (RPM) operation and an overall lower mass system. In a different configuration, the second prime mover may operate to move an air conditioning compressor, such as on a bus used to transport people or on a vehicle used to transport refrigerated cargo.

Various additional aspects and advantages will become apparent to those skilled in the art from the following detailed description of the embodiments. Hybrid vehicle drive systems according to many exemplary embodiments are shown in the applications incorporated herein by reference. The advantageous split shaft PTO and/or gear box architecture discussed herein can be employed in any of the exemplary embodiments disclosed in the applications incorporated herein by reference. The split shaft PTO and/or gear box architecture can be used to achieve the operations described in the applications incorporated herein by reference. Various features of these embodiments can be employed in other embodiments described herein.

As shown in FIG. 1A, an exemplary embodiment of a hybrid vehicle drive system 10 can be employed on any type of vehicle. According to one embodiment, the vehicle can be any type of light, medium, or heavy duty vehicle, such as a truck, bus or vehicle used in off road construction, such as a tractor backhoe, loader or excavator. In some embodiments, the vehicle is a truck that employs hydraulic systems such as a boom truck. Alternatively, the vehicle can be any type of platform where hybrid systems are employed. The vehicle may have a wide variety of axle configurations including, but not limited to a 4×2, 4×4, or 6×6 configuration, or alternatively use tracks.

In some embodiments, the vehicle is a truck such as an International 4300 SBA 4×2 truck. According to one exemplary embodiment, the vehicle includes an IHC MaxxforceDT engine with an output of 255 HP and 660 lbs. of torque. The vehicle further includes an Allison 3500_RDS_P automatic transmission. The vehicle has a front gross axle weight rating (GAWR) of 14,000/12,460 lbs., a rear GAWR of 19,000/12,920 lbs., and a total GAWR of 33,000/25,480. The vehicle includes a hydraulic boom. The vehicle boom has a working height of approximately 54.3 feet, a horizontal reach of 36.0 feet, an upper boom has an extension of approximately 145 inches. The lower boom may travel between approximately 0 degrees and 87 degrees from horizontal. The upper boom may have a travel between approximately −20 degrees and 76 degrees from horizontal. According to an exemplary embodiment, the vehicle may further include a hydraulic platform rotator, a hydraulic articulating jib and winch (e.g., with a capacity of 1000 lbs.), a hydraulic jib extension, hydraulic tool outlets, an on-board power charger providing 5 kW at 240 VAC, and electric air conditioning with a capacity of 5,000 BTU. The above referenced power, boom, and types of components are exemplary only.

System 10 includes a first prime mover 20 (e.g., an internal combustion engine, such as a diesel fueled engine, or a CNG fueled engine, etc.) Other fuels such as gasoline, LNG, propane, bio-fuel, bi-fuels, etc. could be used. System 10 also includes a first prime mover driven transmission 30, a component 40 (e.g., a power take-off (PTO), a transfer case, a gear box, etc.), a second prime mover 50 (e.g., a motor, such as an electric motor/generator, a hydraulic pump, etc.), and an accessory 60 (e.g., an air compressor, air conditioning compressor, fluid pump, a hydraulic pump, such as a variable volume displacement pump, etc.).

In some embodiments, the component can comprise a combination of a PTO, split shaft PTO, and/or one or more additional clutches or PTO(s) mounted to the through shaft PTO. In some embodiments, the component 40 can include a PTO and gear box with dual outputs rotating at different speeds having optional clutches attached to the outputs to engage or disengage a second prime mover or an accessory. The PTO, gear box and clutches can be coupled together or commonly housed in one or more enclosures. In certain embodiments, accessory 60 can act as a third prime mover as described below or a second electric motor can be provided as a third prime mover. Transmission 30 is mechanically coupled to component 40. The second motor can be provided in the location of accessory 60, according to some embodiments. Component 40 is coupled to second prime mover 50 and is coupled to accessory 60. In other embodiments, the accessory may not be present or may be remotely mounted in a different part of the vehicle.

According to one embodiment, component 40 includes a split shaft PTO having an interface for coupling to accessory 60 and a separate interface for coupling to second prime mover 50. Another interface of the split shaft PTO can be directly coupled to transmission 30 or be coupled to transmission 30 through a clutch shift PTO. Similarly, accessory 60 can be coupled directly to the split shaft PTO, that is, in mechanical communication with the first prime mover, or to a clutch shift PTO disposed between the split shaft PTO and accessory 60. Second prime mover 50 can also be coupled directly to the split shaft PTO or to a clutch shift PTO disposed between the split shaft PTO and mover 50 (e.g., the electric motor). In some embodiments, the split shaft PTO idle reduction system or hybrid system can be installed to a bell housing or to a PTO attached directly to the first prime mover.

Figure 1B:
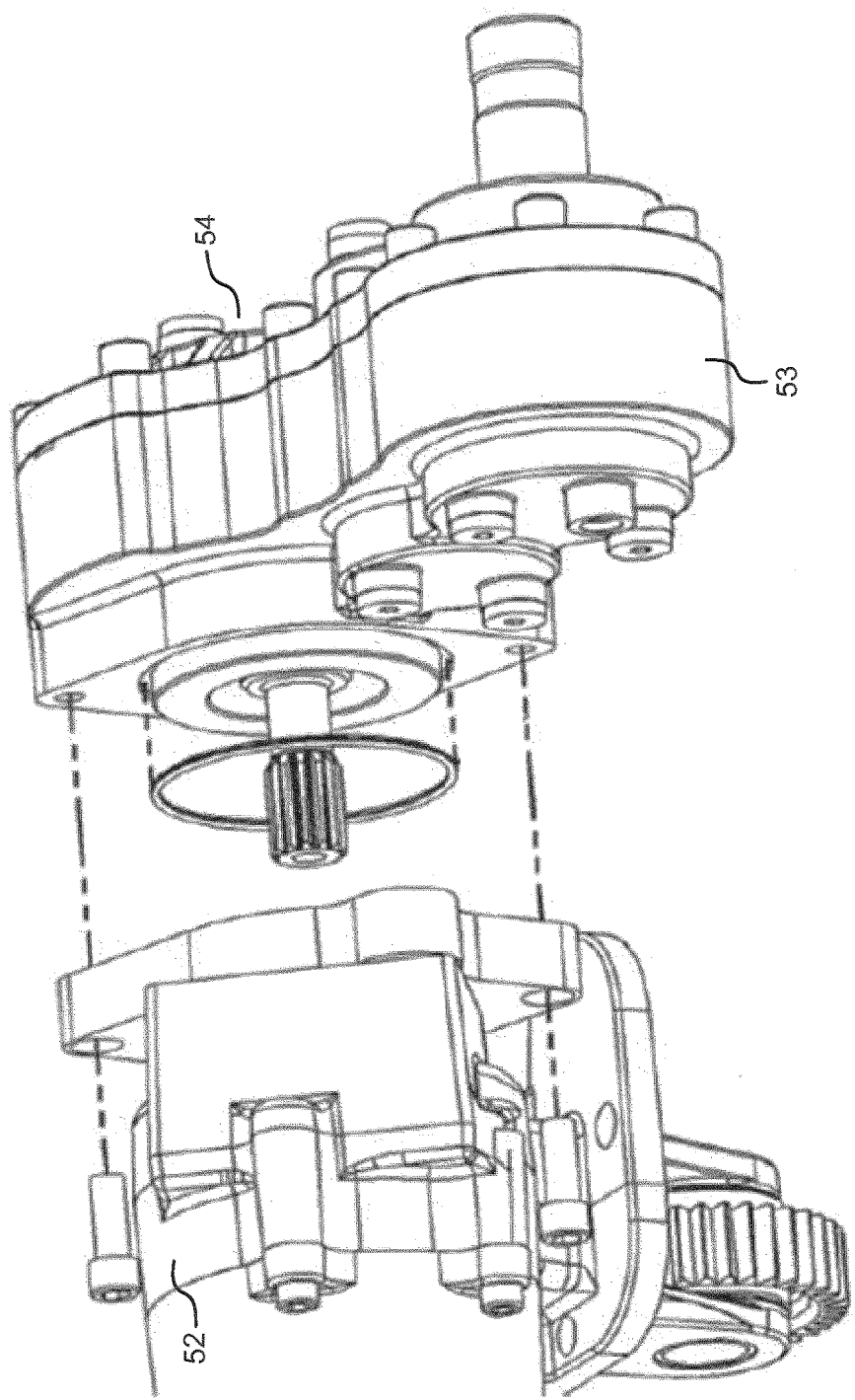
FIG. 1B is a perspective view schematic illustration of a gear box for use in a vehicle drive system using a split shaft component according to an exemplary embodiment.
Figure 1C:
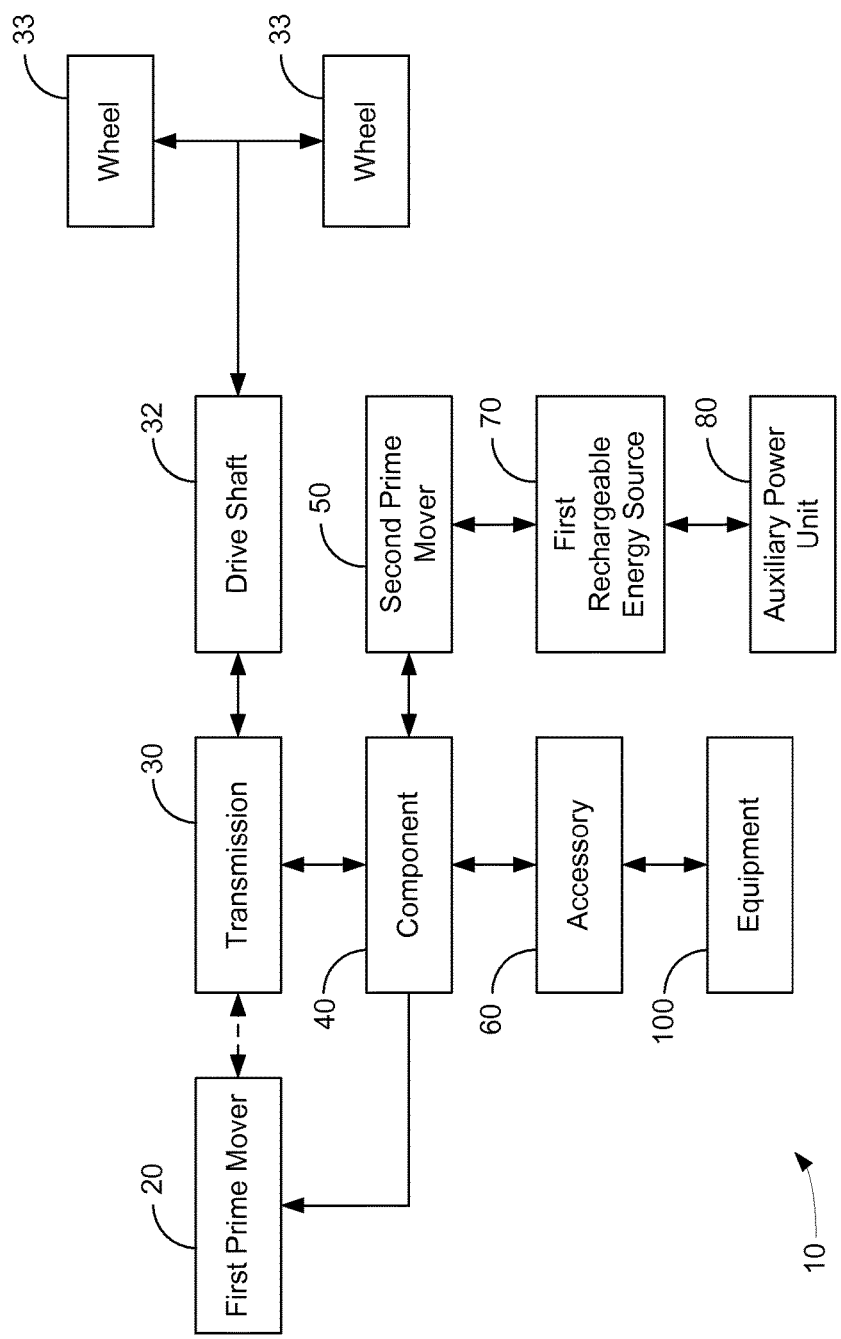
FIG. 1C is a general block diagram of a hybrid vehicle drive system using a first prime mover receiving power from the component and optionally providing power to the transmission.

Referring to FIG. 1C, a general block diagram of a hybrid vehicle drive system using a first prime mover 20 receiving power from the component 40 and optionally providing power to the transmission 30 is shown. According to some embodiments, the component 40 can be coupled to the first prime mover 20. In one example, the component 40 provides power to the first prime mover 20. In another embodiment, the first prime mover 20 is optionally connected to the transmission, as indicated by the dotted bi-directional arrow. A configuration is as shown in FIG. 1C, for example, can be used with a manual transmission or automated transmission.

Figure 3:
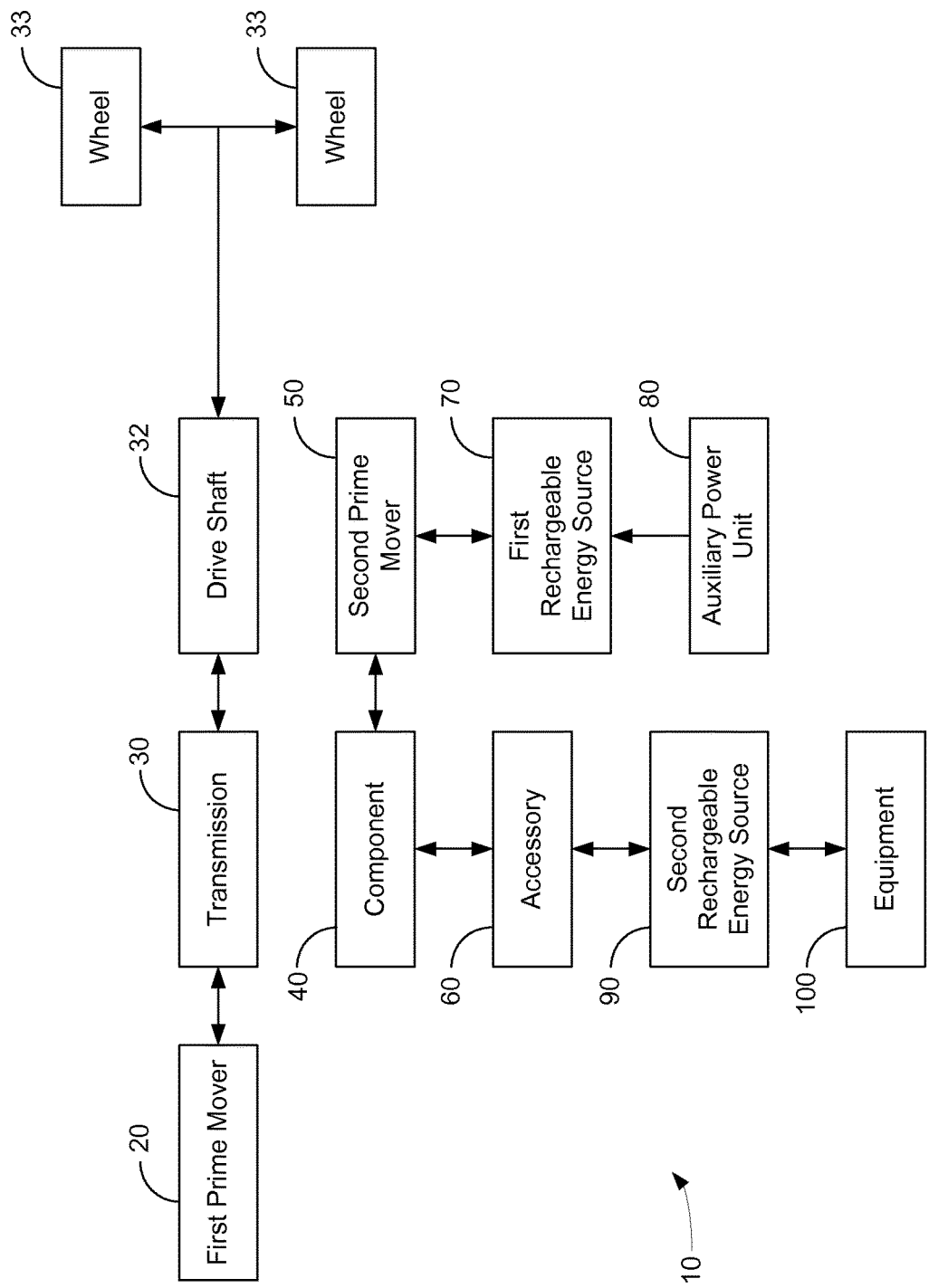
FIG. 3 is a general block diagram illustrating the operation of a hybrid vehicle drive system with the addition of a second rechargeable energy source according to an exemplary embodiment.
Figure 4:
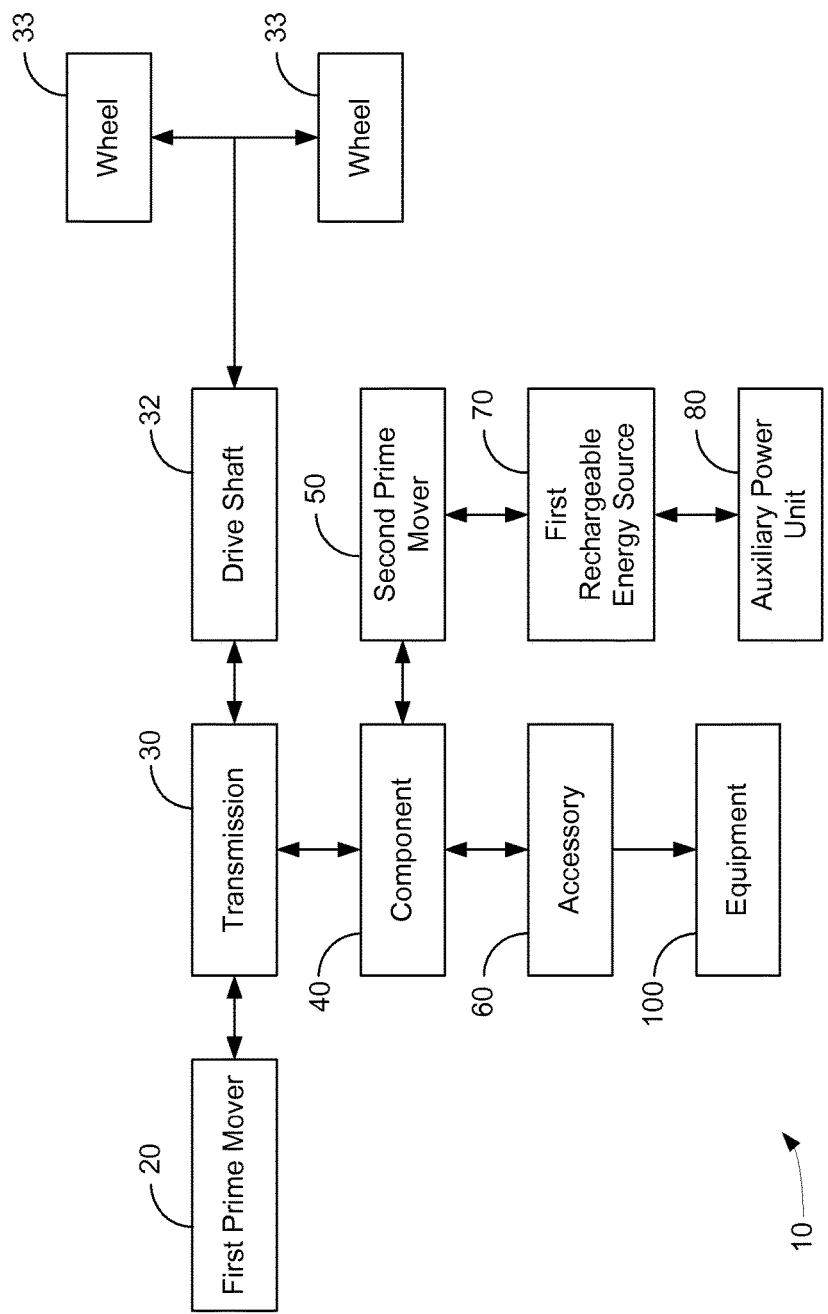
FIG. 4 is a general block diagram illustrating the operation of a hybrid vehicle drive system using a first prime mover providing power to simultaneously charge a first rechargeable energy source and operate equipment according to an exemplary embodiment.

According to some embodiments, second prime mover 50 is a 50 kW electric motor. When acting as a generator (as shown in FIGS. 3 and 4), second prime mover 50 may generate 30 kW continuously or as much as 75 kW or greater at peak times. The above referenced power parameters are exemplary only. Second prime mover 50 may be further used to power various on-board components such as compressors, water pumps, cement mixer drums, etc.

According to some embodiments, system 10 also includes a first rechargeable energy source 70 (e.g., a battery, a bank of batteries, a capacitive cell, or other energy storage device such as, but not limited to, a fuel cell in possible combination with a battery), an optional Auxiliary Power Unit (APU) 80 (e.g., an internal combustion engine, possibly fueled by an alternative low emission fuel (e.g., bio-mass, natural gas, hydrogen, or some other fuel with low emissions and low carbon output), and a generator, or a fuel cell, battery, etc.), an optional second rechargeable energy source 90 (e.g. a hydraulic accumulator, ultra capacitor, etc.), and onboard or external equipment 100 (e.g., hydraulically operated equipment, such as an aerial bucket, etc.). First rechargeable energy source 70 is coupled to second prime mover 50 and provides power for the operation of second prime mover 50. First rechargeable (e.g., pressurized or rechargeable) energy source 70 may include other auxiliary components (e.g., an inverter provided for an AC motor, a DC-to-DC converter to charge a DC system, an inverter for power exportation to a power grid or other equipment, controllers for motors, a charger, etc.). APU 80 is coupled to first rechargeable energy source 70 and provides power to first rechargeable energy source 70. According to one exemplary embodiment, second renewable energy source 90 is a hydraulic system with a high pressure portion (e.g., an accumulator) and a low pressure component (e.g., a reservoir tank).

Second rechargeable energy source 90 is coupled to accessory 60 and provides stored power for accessory 60. Onboard or external equipment 100 can be coupled to accessory 60 or second rechargeable energy source 90 and operate using power from either accessory 60 or second rechargeable energy source 90. In one embodiment, onboard or external equipment 100 is coupled through second rechargeable energy source 90 to accessory 60. According to various exemplary embodiments, APU 80 may also provide power to both second renewable energy source 90 and first rechargeable energy source 70 when high hydraulic loads are required. APU 80 and second renewable energy source 90 may both provide power to hydraulically operated equipment 100.

In some embodiments, component 40 includes a PTO designed to engage or disengage while transmission 30 is moving via a clutch mechanism (e.g., a clutch shift PTO in one embodiment). The PTO can be a street side or curb side PTO, or another location PTO, including but not limited to, a top mount, bottom mount or end mount PTO. Component 40 can be disengaged from transmission 30 when first prime mover 20 exceeds the maximum operating RPM of any component or device connected through component 40, the maximum operating RPM of component 40, or when first prime mover 20 causes such component to exceed the component's maximum operating RPM. For example, component 40 can be disengaged if first prime mover 20 exceeds the maximum operating RPM of accessory 60, or first prime mover 20 causes accessory 60 to exceed the maximum operating RPM of accessory 60. First prime mover 20 may cause accessory 60 to rotate at a different RPM from that of the first prime mover 20 if gears or other means are used to change the relative motion or rotation of components within system 10. Alternatively, all components connected through component 40 can operate throughout the RPM range of first prime mover 20, and component 40 can be engaged continuously. In some embodiments, component 40 can be disengaged during high speed steady driving conditions to reduce friction and wear on system 10. An electric controller such as a vehicle control and monitoring system (VCMS) can control the engaging and disengaging of devices and components.

Alternatively, transmission 30 may be modified to incorporate component 40 and optionally incorporate second prime mover 50 directly into transmission 30. Alternatively, transmission 30 could be a different type of transmission, including but not limited to dual clutch, semi-automatic, auto-shift, manual, continuously variable or other. Transmission 30 could be modified to optionally incorporate second prime mover 50 directly into transmission 30.

Component 40 may interface with transmission 30 at an interface between drive shaft 32 and transmission 30 or between mover 20 and transmission 30 in one alternative embodiment. Alternatively, component 40 may interface with transmission 30 in a way that the interface directly couples component 40 to the torque converter of transmission 30. The torque converter may be in mechanical communication with mover 20, but rotating at a different speed or may rotate at the same speed as mover 20 if it is locked up.

A clutch mechanism can be employed to properly engage and disengage component 40. In another embodiment, component 40 is a PTO that has an internal clutch pack, such as a hot shift PTO. A hot shift PTO can be used when frequent engagements of the PTO are required, often with automatic transmissions. In one embodiment, second prime mover 50 can be operated at the same RPM as first prime mover 20 prior to the engagement of component 40. This is intended to reduce wear on the clutch mechanism if component 40 has a 1:1 ratio of input speed to output speed. If other ratios for component 40 are used, the RPM of first prime mover 20 or second prime mover 50 can be adjusted accordingly prior to engagement to ensure that input and output speed match the ratio of the component to reduce wear on the clutch mechanism.

In FIG. 1A, first prime mover 20 provides power to drive shaft 32 through transmission 30. Second prime mover 50 provides additional or alternative power to drive shaft 32 through component 40 and transmission 30. Drive shaft 32 provides power to two or more wheels 33 used to provide forward and backward momentum to the vehicle. For example, second prime mover 50 can optionally provide the sole source of power to drive shaft 32. Alternatively, second prime mover 50 can provide additional power to drive shaft 32 during vehicle acceleration. When providing power to drive shaft 32, second prime mover 50 can operate using power from first rechargeable energy source 70. According to the various exemplary embodiments of system 10, first rechargeable energy source 70 can be charged or powered by second prime mover 50, APU 80 or another suitable source (e.g., the vehicle alternator, the power grid, etc.). In other embodiments, second prime mover 50 may be operated to minimize harmful emissions from first prime mover 20. As an example, second prime mover 50 may not provide additional power to drive shaft 32 if first prime mover 20 has not reached a defined operating temperature or if the exhaust temperature is below a defined level that reduces the effectiveness of exhaust after treatment systems, causing increased emissions of NOx or other harmful pollutants. Other criteria may be used to suspend the application of power from second prime mover 50. In yet another embodiment, second prime mover 50 may place a load on first prime mover 20 by operating as a generator or pump. Energy from second prime mover 50 may be stored in a rechargeable energy source 70, or alternatively may be released through a resistor cooled to dissipate heat if the power is transmitted by electricity or through a valve if the power is transmitted by a fluid. In some embodiments, the control system for system 10 may not fully charge rechargeable energy source 70 if it is likely that second prime mover 50 may be operated to place a load on first prime mover 20. For example, the system may not recharge fully so second prime mover can be a generator and help to warm up engine and or exhaust system more quickly if left unused, such as if recharged by grid overnight. Placing an additional load on first prime mover 20 may increase the rate that the exhaust temperature reaches a higher level, reducing the time that the after-treatment system is operating less effectively, or the time that the after-treatment system is using additional energy to reach an appropriate temperature for reduction of harmful emissions. The controller for system 10 may use an algorithm that provides logic for the operation of second prime mover 50. Using such logic from the control system, second prime mover 50 may be operated so that first prime mover 20 and/or the exhaust after-treatment of first prime mover 20 are operated to both reduce harmful criteria emissions, such as NOx and also reduce greenhouse gasses (GHG), such as CO2. The controller for system 10 may also cause system 10 to operate so that diagnostics monitoring first prime mover 20 and exhaust after-treatment system are not adversely affected.

Optional APU 80 can be used to power first rechargeable energy source 70 when the vehicle is driving up a grade, as well as other situations. This use is intended to improve vehicle performance, particularly when the power requirements of the vehicle exceed the power available from first prime mover 20, first rechargeable energy source 70, and second rechargeable energy source 90. The presence of APU 80 is intended to allow for a smaller first prime mover 20. In one embodiment, APU 80 is of a type that produces lower emissions than first prime mover 20 and/or eliminates use and extends range or duration of low emissions operation stationary and/or moving. APU 80 (e.g., including but not limited to a fuel cell) is intended to enable a vehicle using system 10 to meet various anti-idle and emission regulations.

In one embodiment, second rechargeable energy source 90 is utilized, and provides power to accessory 60. Additional or alternative power can be provided to drive shaft 32 by accessory 60. For example, accessory 60 can provide power to drive shaft 32 until second rechargeable energy source 90 is discharged. Alternatively, accessory 60 can provide additional power to drive shaft 32 during vehicle acceleration. Accessory 60 provides power to drive shaft 32 through component 40, and transmission 30. The combination of power provided to drive shaft 32 by second prime mover 50 and accessory 60 is intended to allow for the use of a smaller first prime mover 20 which provides the best use of stored energy and reduces the overall system mass. In another embodiment, accessory 60 only receives power from second prime mover 50 or from first prime mover 20 through component 40 and does not provide power to drive shaft 32. Accessory 60 may power equipment directly.

In one exemplary embodiment, an optional clutch can be coupled between first prime mover 20 and component 40. The clutch is disengaged when the vehicle is stationary so second prime mover 50 can turn accessory 60 without unnecessarily driving transmission 30.

A variety of control systems can be utilized to control the various components (clutches, motors, transmissions, etc.) in system 10. Electronic control systems, mechanical control systems, and hydraulic control systems can be utilized. In addition, a controller can be provided to indicate a request to operate an accessory or other equipment. In one embodiment, a controller similar to the controller in U.S. Pat. No. 7,104,920 incorporated herein by reference can be utilized. Preferably, the controller is modified to communicate by pneumatics (e.g., air), a wireless channel, or fiber optics (e.g., light) for boom applications and other applications where conductivity of the appliance is an issue. The control system can utilize various input criteria to determine and direct the amount of power required or to be stored, the input criteria can input operator brake and acceleration pedals, accessory requirements, storage capacity, torque requirements, hydraulic pressure, vehicle speed, etc.

Figure 7:
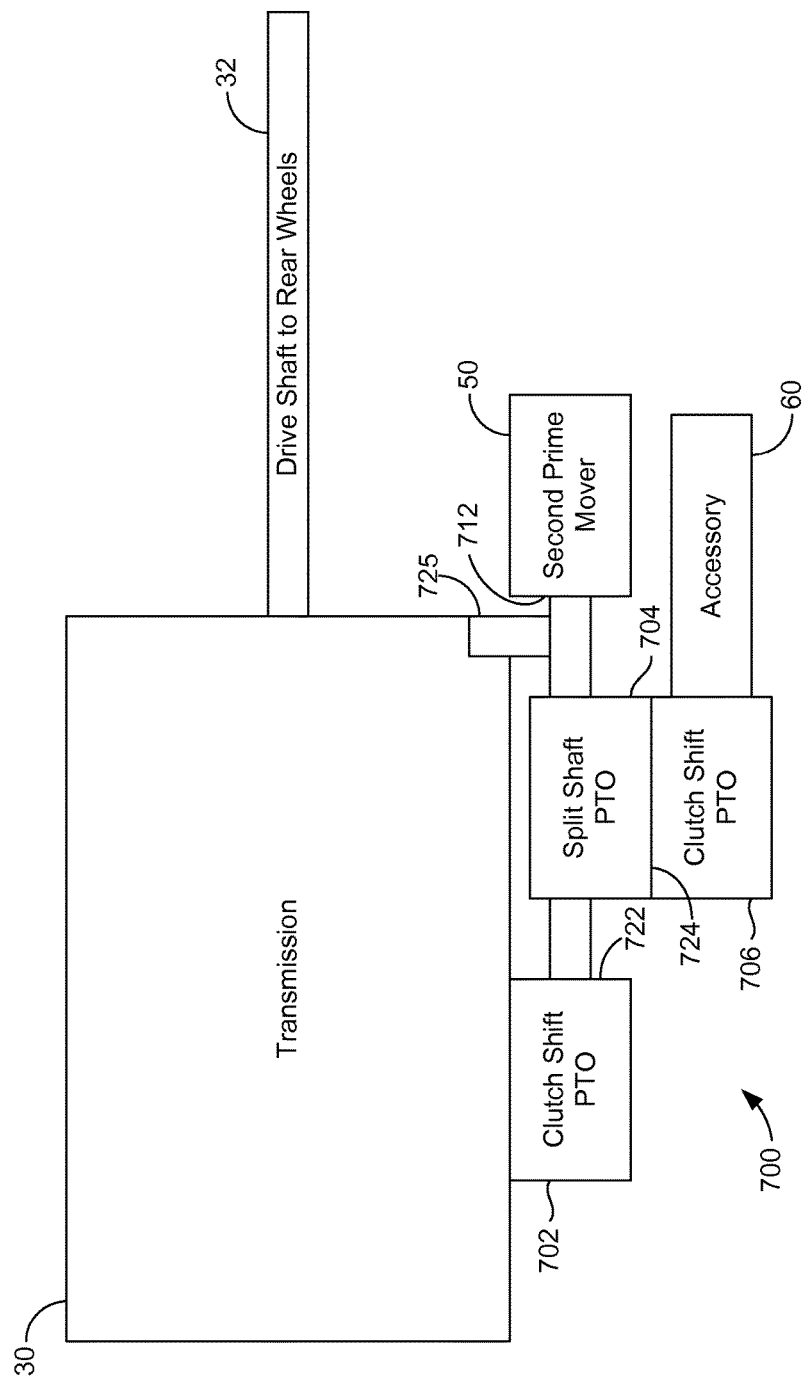
FIG. 7 is a general block diagram illustrating a split shaft PTO architecture for the system illustrated in FIGS. 1-6 according to another exemplary embodiment.

A control system may control the torque and/or power output of second prime mover 50 and accessory 60 so that component 40, second prime mover 50 and accessory 60 are operated within the allowable torque and/or power limitations of each item so that the sum of second prime mover 50 and accessory 60 do not exceed component 40 or exceed capacity of transmission 30, such as capacity of a transmission power takeoff drive gear rating or exceed capacity of transmission maximum turbine torque on an automatic transmission. Optionally the controller may monitor and control additional input torque from prime mover 20, or input torque of prime mover 20 after multiplication by the torque converter, along with that from other prime movers 50 or accessories 60 to ensure that the turbine torque limit is not exceeded or other internal torque ratings of components within an automatic transmission or an auto shift manual transmission, or a manual transmission are not exceeded. The torque and/or power output of second prime mover 50 and accessory 60 may also be controlled using an input from the driver and/or from a power train control system. If two components are used as described in other embodiments, the torque and/or power output of the second and third prime mover and optional accessory or accessories may be controlled so that the transmission power takeoff drive gear rating with two power takeoffs is not exceeded or that the capacity of transmission maximum turbine torque on an automatic transmission, or other torque rating of an internal component within a transmission of different kind, such as an auto-shift manual or manual transmission, is not exceeded. If a split-shaft, including but not limited to also using a gear box and an optional clutch, is used to couple second prime mover 50 to component 40 (component 40 may be a PTO that is coupled to transmission 30, and may have a clutch embedded in the component 40), torque may be transmitted directly to component 40 without having to rotate accessory 60 by using another PTO with a clutch. The component 40 may include a split shaft or a gear box 53. An additional PTO can be connected to the split-shaft PTO as shown in FIG. 7. Alternatively, it may be possible to embed gears in the housing of the split-shaft PTO assembly, along with an optional clutch and attachment point for accessories, thereby eliminating the need for a separately attached PTO to the split-shaft PTO. Accessory 60 may be couple to the split-shaft PTO by yet another PTO as described above. Such additional PTOs may have a clutch embedded in the device, or external to the device, to uncouple the accessory from the split shaft. This may be advantageous in situations in which it is unnecessary to power accessory.

Unnecessarily powering accessory 60 can introduce unwanted parasitic drag or losses in efficiency. The split shaft can usually be coupled so that the shaft can transmit torque and rotational power. If there is a fault in the electric motor coupled to the end of the split shaft, it may be advantageous to uncouple the shaft using the split shaft feature. Uncoupling the split shaft would separate the electric motor from the power train, so that it does not rotate. This is a potential advantage in some failure modes since the stationary motor is less likely to produce potentially harmful voltage. As an example, rotating the motor if there is an open or a short circuit could cause a hazardous situation. Such a fault may be detected by a high-voltage interlock loop (HVIL). By allowing the motor to be disconnected and mechanically isolated from the drivetrain, the split-shaft design offers unique advantages over other hybrid designs that embed the motor in the drivetrain and make it impossible to hold the motor stationary during a fault while the vehicle is in motion. If the additional PTO is coupled to the split shaft before the split, then accessory 60 can continue to receive torque when the motor is mechanically disconnected from other moving components.

Referring to FIG. 1B, the split shaft could incorporate different components, such as a gear box 53 attached to a PTO 52 with optional clutches configured to be placed variously within the system. According to one embodiment, an optional clutch may connect the gear box 53 to one or more second prime movers (e.g., electric motor or hydraulic motor) and/or accessories (e.g., hydraulic pump or air compressor for truck mounted equipment). In another embodiment, a clutch may be placed in the PTO 52 housing or mounted in between the PTO 52 and the gear box 53. For example, gears internal to the PTO 52 may provide an output that is a ratio of the first prime mover speed. Similar functionality maybe provided by the combination of the PTO 52 and the gear box 53. According to one embodiment, the system as related to FIG. 1B, for example, has at least one clutch. The at least one clutch prevents the transmission from rotating with the electric mode when the system is in a stationary mode, for example. It is understood that the system can have a plurality of clutches variously placed throughout the system. In another embodiment, the PTO 52 and the gear box 53 can share a common housing. The split shaft may have or use only one output shaft to transfer power to and or from a second prime mover without using a secondary shaft to power an accessory. Using only a second prime mover 50 coupled to transmission 30 may be advantageous if the vehicle only needs to use electrical power and does not need to provide hydraulic or pneumatic power for equipment or vehicle systems. Coupling only the second prime mover 50 to the transmission 30 can also be an advantage if the vehicle uses an additional, independent electrical motor receiving power from system 10 to drive a remotely mounted accessory, such as a hydraulic pump or compressor driven by another remotely mounted electric motor. Such hydraulic pump may be located in the housing attached to or in close proximity to hydraulically powered equipment mounted to the vehicle, including, but not limited to, cranes, aerial devices, digger derricks, or other equipment or systems needing hydraulic power. The use of the second electric motor directly powering an accessory mounted close the equipment being operated provides benefits, including but not limited to, a reduction in the size of the hydraulic system and associated hoses in comparison to systems that require the hydraulic pump to be mounted in close proximity to the power take-off. Referencing FIG. 1B, in some embodiments the a component 40 may be directly mounted to the first prime mover. In embodiments employing a split-shaft as described throughout, the component 40 may also be directly mounted to the first prime mover. In some embodiments implementing a manual transmission, for example, and engine can be mounted to the PTO.

In some embodiments, the electric motor or second prime mover 50 can be coupled to output 54 and provide propulsion through PTO 52, provide regenerative braking through PTO 52. Second prime mover 50 can also provide all electric operation when the vehicle is stationary and power accessory 60 through the other output of gear box 53. An optional clutch (or a clutch internal to PTO 52) can be used to disengage the drive train from gear box 53 during stationary all electric operation in some embodiments. In some embodiments, second prime mover 50 is driven by first prime mover 20 while accessory 60 is simultaneously driven via gear box 53.

Component 40 can be directly mounted to first prime mover 20 and can be directly mounted as part of the split shaft architecture or the architecture of FIG. 1B. In a manual transmission embodiment, component 40 can be an engine mounted PTO.

According to some embodiments, output from the gear box 53 may attach to the second prime mover 50 or to an accessory 60. The output can have a speed at the same or at a different ratio in comparison to the input to the gear box 53. For example, an upper output 54 of the gear box 53 can have a higher speed (rpm) in comparison to the rotational speed of the first prime mover 20, have the same rotational speed of the output of PTO 52, but have a lower rotational speed (rpm) in comparison to the output gear on the other end of gear box 53. The difference in speed between the outputs of the gear box 53 may vary depending upon the gears internal to the gear box 53 and could be in a different ratio than the example, so that in yet another example, the upper output 54 may have a higher rotational speed in comparison to the lower output positioned on the other end of the gear box 53. The output with the higher rpm can be used to drive an electric motor, which can be driven at a higher rpm than, for example, a first prime mover (e.g., motor). In one embodiment, a permanent magnet motor is used with a clutch on an output of the gear box and can be clutched off (uncoupled) when unwanted high voltage events are sensed by the system, as an example, in the event of a disconnected high voltage electrical harness or an open in the wiring, causing a fault in the system, one or more clutches normally coupling the second prime mover 50 to the first prime mover 20 may be uncoupled. If a clutch is mounted in between the gear box 53 or split shaft it may be possible to uncouple the second prime mover 50, while continuing to power the accessory 60 using first prime mover 20. According to another embodiment, an induction motor can be used, wherein the induction motor does not require or implement the use of a clutch to uncouple the induction motor from the first prime mover 20, as an example, in the event of a failure, the induction motor may be able to be rotated without generating any electrical current. In yet another embodiment, the lower output from the gear box 53 can be at the PTO speed (rpm) or less than the engine (e.g., first prime mover) rpm. The lower output can also be used for a hydraulic motor, which is driven at a lower rpm. In some embodiments, the hydraulic motor can be driven at a lower rpm than an electric motor. According to further embodiments, an output from the gear box 53 can have a higher output speed in comparison to input speed to the gear box 53, which may serve as an advantage for electric motors that typically operate more efficiently at a higher speed (RPM) than that of the first prime mover 20.

When second prime mover 50 is mounted on the end of the split-shaft PTO, it is possible to use an end mount electric or hydraulic motor in one embodiment. There is often a greater choice of components that can be end mounted rather than through shaft mounted.

In one embodiment, a solid shaft rather than a split-shaft PTO can be used if there is no need to sever mechanical communication of second prime mover 50 or accessory 60. Mover 50 and accessory 60 can be attached to the end of the shaft with the mechanical input to the front of the shaft. Such an assembly may be housed and lubricated internally or externally and may have gears that allow the attachment of accessories. A solid shaft assembly may be less expensive than a split-shaft PTO. The front of the shaft maybe coupled to a component 40, such as a PTO with a clutch, sometimes referred to as a "hot shift" PTO. Alternatively, the front of the shaft may be attached to a gear that is in mechanical communication with transmission 30 and a clutch may be mounted on the end of the shaft closer to second prime mover 50. Such a design may have similarity to 890/897 Series power take-off from Parker Hannifin Corp. A gear can be embedded in the housing to allow for an accessory or another PTO and accessory to be mounted to the solid shaft in certain embodiments. A clutch or other means can connect and disconnect devices that interface with the gear in certain embodiments.

The location of the PTO that attaches to the split-shaft PTO or solid shaft PTO can be positioned to clear other vehicle components, such as transmission housing, frame rails, wiring, hoses, war system, etc. Other components may be designed to also clear obstructions that may cause mechanical interference. An example of a split shaft PTO is shown on FIGS. 7-9, component 704, other configurations are possible. The solid shaft PTO can perform the same function as component 704, except that the shaft does not split. The solid shaft may not have a means to disconnect second prime mover 50 and/or accessory 60 from clutch shift PTO (clutch shift PTO example shown on FIG. 7, component 702). The solid shaft PTO consists of a shaft with gears, or some other means to transmit mechanical force or energy, that allows the attachment of an additional PTO, such as component 706, with or without a clutch. Optionally, solid shaft PTO may directly interface with accessory 60 and/or second prime mover 50. An extension to the PTO can be provided so that the PTO can be mounted further from the split-shaft PTO or solid shaft PTO. As an example, in FIG. 7, components 704 and/or 706 may be extended or have additional gears to move accessory 60 (or second prime mover 50) further from transmission or obstructions. Optionally, an additional component may be placed in between component 704 and 706 in FIG. 7 to transmit force or energy in order to further separate component 704 and 706, or change the rotational speed of the components.

In alternative embodiments, one or more housings may enclose the moving parts shown as separate components in FIG. 7, reducing the number of interfaces and individual components. While combining functions or mechanical elements of multiple components by enclosing them in fewer housings or cases may simplify the design and reduce cost, additional tooling and testing costs may be incurred. There may also be less flexibility to accommodate different packaging constraints if components are combined. In yet another embodiment, there may be more than one PTO, such as component 706 in FIG. 7, coupled to the split shaft PTO, such as component 704 in FIG. 7, or solid shaft PTO. Split shaft PTO devices often have the ability to be mechanically coupled to more than one PTO. In some configurations, the second prime mover may optionally be connected by a shaft without or with a joint, such as a U-joint or constant velocity joint, so that second prime mover may be mounted away from the transmission and directly to the frame of the vehicle. The shaft may allow movement co-axially and/or torsional movement so that transmission movement and vibrations are damped or not transmitted to second prime mover. Second prime mover may optionally be mounted directly to the transmission and not the frame. The transmission may vibrate or move differently than other parts of the vehicle, such as the frame, because it is coupled to the first prime mover which may use engine mounts or other means to allow first prime mover to not be rigidly mounted to the vehicle.

Some split-shaft PTO designs may require the shaft to be stationary before it can be disconnected in certain embodiments. This may be the case if an interlocking type of coupling is used rather than a clutch. Air or some other means of activation may be used to separate the shaft within the split-shaft PTO. The following method may be used if it is necessary to mechanically separate the shaft according to one embodiment.

1. clutch in component 40 is disengaged, and
2. Air, electric, hydraulic or other means may be used to open the clutch, or interlocking coupler, disconnecting transmission 30 from one of the outputs of component 40. Second prime mover 50 may beheld stationary relative to split shaft if interlocking coupler is disconnected.

The mechanical disconnect function within the split-shaft PTO can be used to separate the shaft within the split-shaft PTO. In one embodiment, there may be a gear on the input section of the split-shaft PTO that can be used to transfer power to accessory 60 in one embodiment. To continue to operate accessory 60 while second prime mover 50 has been mechanically isolated from other moving parts of system 10, first prime mover 20 is started and operated, and component 40 is operated (which might involve engaging a clutch 70 within a PTO before or after first prime mover is started) in one embodiment. Component 40 rotates the front end of the split shaft and attached gear. An optional "Hot shift" PTO maybe attached to the split-shaft PTO. If so, then the clutch is also engaged in the PTO, which allows the output shaft to rotate and also rotate the accessory. Clutches, interlocking couplers, spiral jaw couplings, and other means may be used to engage or disengage the split shaft, causing power to either be transmitted through the split shaft or for the shaft to be separated in such a way the little or no power is transmitted through the coupling in certain embodiments.

During driving if second prime mover 50 is working, the split-shaft PTO is operated such that the both the front and back of the shaft are in mechanical communication and rotate. This allows second prime mover 50 to optionally power transmission 30 and for transmission 30 to optionally power second prime mover 50 through component 40 in one embodiment. During this mode of operation, it may be advantageous to remove the accessory load from the drivetrain by opening the clutch of the PTO connected to the split-shaft PTO. This type of operation has some benefits over a through-shaft second prime mover with an accessory attached to the through shaft because the entire assembly can be shorter and more compact, permitting greater packaging options on a vehicle and because a standard PTO can be installed on the split-shaft PTO. Changes or installation of components by other manufacturers after the hybrid system is installed can be minimized with such an architecture. Lower cost gear pumps and other accessories may be used if the PTO mounted to the split-shaft PTO has a clutch allowing the accessory to be disconnected when not needed. Different input/output ratio PTO devices may be used to best match the rpm requirements of various components, such as the second prime mover or the accessory. A control system may cause first prime mover and/or second prime mover to operate at multiple RPM levels when coupled to accessory if different power levels or differing equipment operating speeds are required.

An optional shaft may extend from the end of the split-shaft PTO. The shaft may be connected by u-joints or other couplings, allowing the second prime mover to mounted further from transmission 30 and possibly to another part of the vehicle, such as the vehicle frame, in one embodiment.

Figure 2:
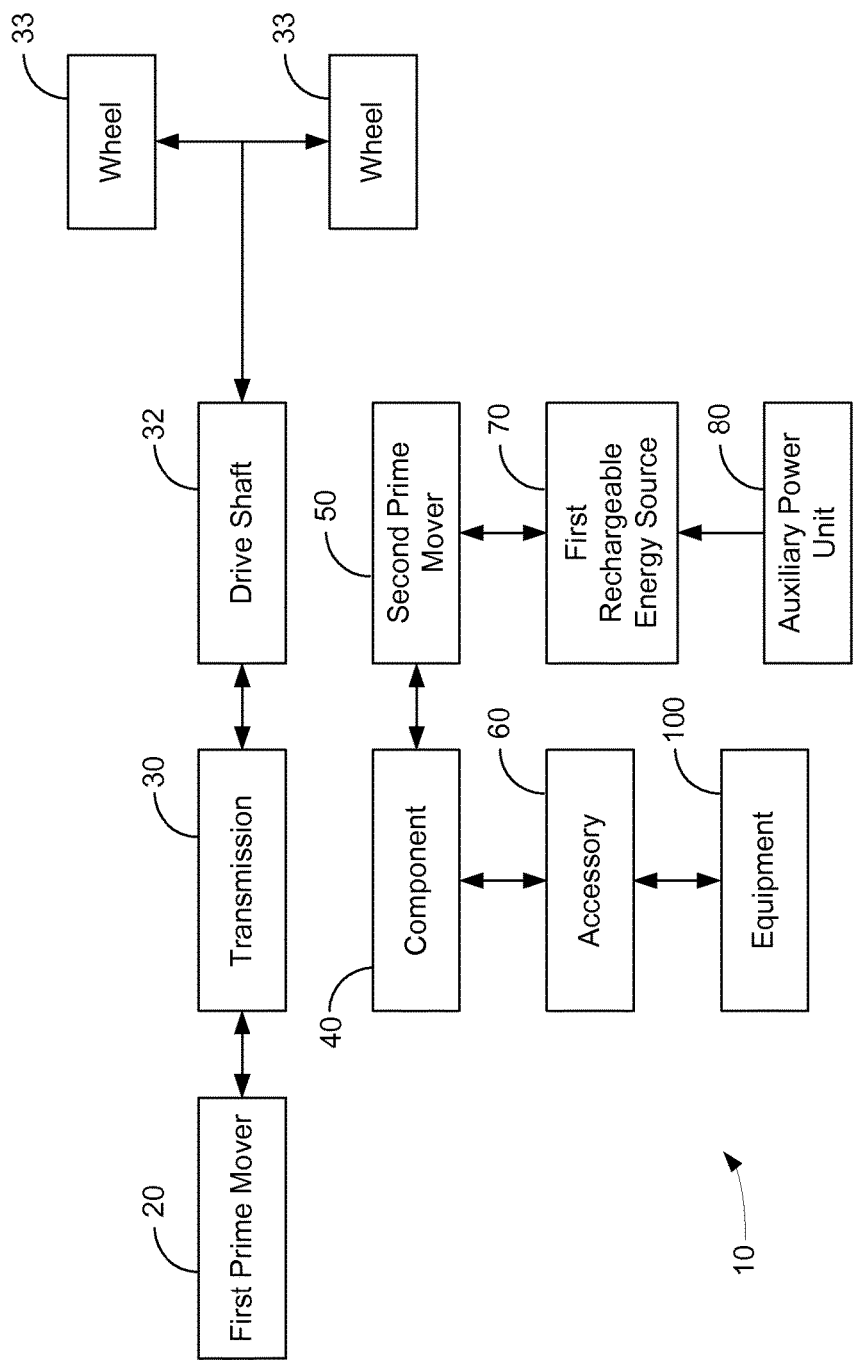
FIG. 2 is a general block diagram illustrating the operation of a hybrid vehicle drive system using an auxiliary power unit, second prime mover and accessory components to operate equipment according to an exemplary embodiment.

Referring to FIG. 2, an exemplary operation of system 10 is shown. Component 40 is disengaged from transmission 30. APU 80 charges or provides power to first rechargeable energy source 70 when necessary. APU 80 can include a generator powered by an internal combustion engine, or a fuel cell. The generator can be connected to first rechargeable energy source 70 through a power converter, AC/DC power inverter or other charging system. First rechargeable energy source 70 provides power to second prime mover 50. The operation of second prime mover 50 operates accessory 60. Accessory 60 provides power to on-board or external equipment 100. First rechargeable energy source 70 and/or APU 80 may provide all the power for system 10 when the vehicle is stationary and first prime mover 20 is turned off (e.g., in an idle reduction system). If second prime mover 50 is not coupled to drive shaft 32 and instead provides power to accessory 60 (e.g., in an idle reduction system), system 10 may include a simplified control and power management system.

According to another exemplary embodiment, component 40 may be mechanically coupled to first prime mover 20 and may be operated periodically to provide power to second prime mover 50 through transmission 30. Second prime mover 50 recharges first rechargeable energy source 70 and/or powers accessory 60. Accessory 60 can recharge second rechargeable energy source 90 or operate other equipment such as equipment 100.

According to another exemplary embodiment, system 10 is configured as an idle reduction system that can provide power to vehicle loads such as HVAC, computers, entertainment systems, and equipment without the need to idle the engine continuously. Accordingly, system 10 uses an electric motor (e.g., prime mover 50) to power a hydraulic pump (e.g., accessory 60) for the operation of hydraulic equipment (e.g., aerial buckets, hydraulically powered compressors, etc.). Alternatively, the electric motor may directly power a compressor. The electric motor can be configured to only operate when there is a demand for hydraulic flow or the need to operate other mechanically coupled equipment to conserve energy within first rechargeable energy source 70. The electric motor can be activated by a controller that receives a signal sent through fiber optics or a signal sent through other means. In one embodiment, the system may utilize air or other fluid to transmit the signal. There may be a pneumatic valve, plunger or other means to send a change in pressure through a pressurized line to a sensor. The sensor may send an electric signal to a controller to operate the electric motor. Such a means may be useful if it is necessary to mount the control input for an operator in an area where use of electrical switches may not be desirable, such as near the outlet of a fuel tank that may be mounted on a truck or in an electrically insulated bucket on a boom truck. If the pneumatic control input uses air from a truck air brake system, it may be necessary to monitor the pressure of the air brake system to ensure sufficient pressure. If pressure drops below a threshold it may be necessary to operate a compressor to pressurize the air brake system, such a compressor may require turning on the first prime mover or operating an electric motor. If the system 10 is used on a vehicle that pumps combustible fluid, such as a fuel tanker, accessory 60 may be a hydraulic pump that is used to transmit power to a separate pump for movement of combustible fluid. The separate pump can move the combustible fluid, or other fluid, without being directly connected to an electrical source The control system for system 10 may monitor rechargeable energy source, such as a battery, and use an input from a battery management system (BMS) to provide advanced notice of certain limits being approached which would derate, or lower the available power and/or energy from the rechargeable energy source (battery) below the power or energy required for a stationary load. If such condition is detected, the controller may initiate the starting and operation of the first prime mover 20 (engine) before the limit is reached which would degrade battery performance below an established threshold. Use of first prime mover 20 (engine) to supplement or take 100% of the load from the accessory 60 and operate the accessory 60 is intended to avoid a discontinuity in operation, or a reduction in operation, of the accessory 60. According to one embodiment, advanced notice of the need to use first prime mover 20 to operate accessory 60 and to allow second prime mover 50 to reduce power or discontinue operation, may be, without limiting the concept, an upward trend in temperatures of the battery system or cells, if the first rechargeable energy source 70 is a battery, that may continue to rise and cause the battery to overheat (during discharge and/or charge). Other problems with first rechargeable energy source 70 may cause first prime mover 20 to operate accessory 60 without operating second prime mover 50, including voltage approaching maximum cell voltage, (which may cause the controller to operate system 10 to prevent the overcharge of first rechargeable energy system 70 by not using second prime mover 50), voltage approaching minimum, (causing system 10 to operate so as to not discharge battery below a threshold potentially causing damage), power level reaching a maximum that will not allow accessory to operate at desired higher power level. Some batteries can have higher short-term battery power output or can receive higher short-term power input, usually measured in seconds or a few minutes. Once the maximum time has been reached for a higher power pulse, the battery may need to reduce power. System 10 and the control system for system 10 may anticipate that reduction in power is probable from the rechargeable energy source 70 and start the engine so that the engine can supplement power seamlessly to the accessory 60. Such a control strategy can be advantageous, since it may allow the rechargeable energy source 70 (battery or hydraulic accumulator) to be sized smaller, which can reduce overall cost, while still allowing system 10 to provide emissions free, all electric stationary operations for many use cases, without use of the first prime mover (engine) 20. The engine may be available to provide power if the battery can't perform at the desired level and meet 100% of all-electric requirements. Such a control strategy can be especially useful for stationary operations that need to turn a PTO.

In one embodiment, mover 20 is not engaged with component 40 when mover 50 is used to power a pump or other devices mechanically coupled equipment 100. While component 40 (PTO) is not engaged, the PTO may be modified to allow shaft 32 to spin with low resistance. A PTO can be chosen with a feature that normally limits movement of the PTO when not engaged; this feature can be disabled when the electric motor is used to power the hydraulic pump. This concept also applies to "operating modes" for hybrid system processes discussed below with reference to FIGS. 3 and 4 in certain embodiments. This type of idle reduction can be used when the vehicle is stationary.

Batteries (e.g., rechargeable energy source 70) provide energy for the electric motor (e.g., mover 50). After the batteries are depleted, an external power grid is used to recharge the batteries.

If the rechargeable energy reserve is large enough, the electric motor (mover 50) may operate continuously, eliminating the need for a controller to turn motor on and off based upon demand. Such a system may be coupled to a variable volume displacement pump to reduce flow when demand for hydraulic flow is low, resulting in lower consumption of power from the rechargeable energy source. This same method of continuous operation can also be used for hybrid system configurations.

In yet another embodiment, second prime mover 50 provides power to external devices directly or through an additional rechargeable energy source and an associated inverter. Utilizing second prime mover 50 to power external devices is intended to lessen the need for an additional first prime mover 20 powered generator.

In yet another embodiment, a sophisticated control system (e.g., a pump control system utilizing fiber optics, etc.) can be used to control the operation of accessory 60. In yet another embodiment, accessory 60 is a variable volume displacement pump. Accessory 60 can operate continuously, only providing flow if there is a demand. When no demand is present, accessory 60 provides little or no additional friction or resistance within the system.

Second rechargeable energy source 90 is optional. Source 90 can be a tank for compressed air, a hydraulic accumulator. Accessory 60 might also power or be an air conditioning system including a compressor and an AC accumulator that is charged/pressurized.

The accumulator can store and meter out excess Freon (or other coolant) as needed by the a/c system as well as dry moisture from system.

Referring to FIG. 3, another exemplary operation of system 10 is shown. First rechargeable energy source 70 and/or APU 80 may provide power for system 10 when the vehicle is stationary and first prime mover 20 is turned off (e.g., in an idle reduction system). For example, as shown in FIG. 3, energy source 70 may power accessory 60. In one embodiment, second rechargeable energy source 90 is utilized. Accessory 60 stores energy in second rechargeable energy source 90 as shown. Second prime mover 50 is engaged to operate accessory 60 (e.g., a hydraulic pump) through component 40 when the stored energy in second rechargeable energy source 90 (e.g., a hydraulic accumulator) is reduced to a predetermined level. The utilization of second rechargeable energy source 90 is intended to reduce operation time of accessory 60. Accessory 60 only needs to operate to maintain energy in second rechargeable energy source 90. On-board or external equipment 100 (e.g., any hydraulic equipment) is powered by second rechargeable energy source 90. In one embodiment, a clutch mechanism is used to disengage accessory 60 from component 40 and second prime mover 50 during vehicle travel when second rechargeable energy source 90 has been fully charged. This is intended to reduce friction on system 10 when second prime mover 50 is needed, but accessory 60 is not. Second rechargeable energy source 90 can provide hydraulic power to equipment 100 at a constant system pressure through a pressure reducing valve.

Alternatively, second rechargeable energy source 90 and two hydraulic motor/pump units are coupled together to provide constant system pressure and flow. The first unit (e.g., a hydraulic motor) receives high pressure flow from second rechargeable energy source 90. The first unit is coupled to a second unit (e.g., a pump) which supplies hydraulic power to equipment 100 at a lower pressure. Both hydraulic second rechargeable hydraulic circuit and low pressure hydraulic equipment circuit have a high pressure and a low pressure (reservoir or tank) sections. A control system may be utilized to maintain constant flow in the low pressure hydraulic equipment circuit as the high pressure flow from the second rechargeable source (accumulator) reduces or varies. The advantage of this configuration is that the energy from the high pressure accumulator is more efficiently transferred to the equipment. This configuration also allows independent hydraulic circuits to be used for the propulsion system and for equipment 100. The independent hydraulic circuits allow for fluids with different characteristics to be used in each circuit. Further, a hydraulic circuit that may be susceptible to contamination (e.g., the equipment circuit) can be kept separate from the other hydraulic circuit (e.g., the propulsion circuit).

In another embodiment, second rechargeable energy source 90 is utilized, and accessory 60 is a hydraulic pump. Second rechargeable energy source 90 can include a low pressure fluid reservoir and a hydraulic accumulator. The utilization of second rechargeable energy source 90 obviates the need for a sophisticated pump control system and the associated fiber optics; instead a simpler hydraulic system can be used (e.g., an insulated aerial device with a closed center hydraulic system and a conventional control system, etc.). If the speed of accessory 60 slows due to depletion of on-board power sources, accessory 60 can operate longer to maintain energy in second rechargeable energy source 90. This is intended to minimize any negative effects on the operation of equipment 100. According to one exemplary embodiment, second prime mover 50 is an AC motor and turns at generally a constant rate regardless of the output volume of accessory 60 (e.g., to create two or more different levels of flow from accessory 60).

However, in some scenarios, second prime mover 50 may provide power to accessory 60 and the speed of second prime mover 50 may be varied by a controller. For example, the speed of second prime mover 50 may be varied to reduce the flow of fluid from accessory 60 (e.g., for two speed operation of an aerial device where lower hydraulic flow may be desirable for fine movement of the boom).

In one embodiment, system 10 can provide the advantage of allowing a vehicle to operate at a work site with fewer emissions and engine noise by using an operating mode. In an operating mode (as shown in FIGS. 3 and 4), first prime mover 20 (e.g., an internal combustion engine, such as a diesel fueled engine, etc.) is turned off and component 40 (PTO) is disengaged from transmission 30, and component 40 when disengaged is able to spin freely with little resistance, and power from first renewable energy source 70 and second renewable energy source 90 are used to operate on-board or external equipment 100 and electrical systems of the vehicle such as "hotel loads" (e.g., HVAC, lighting, radio, various electronics, etc.). According to another exemplary embodiment, second renewable energy source 90 may be optional and first renewable energy source 70 may directly power to equipment 100. According to one exemplary embodiment, first renewable energy source 70 has a capacity of approximately 35 kWh and is configured to provide enough power to operate the vehicle for a full day or normal operation (e.g., 8 hours).

Referring to FIG. 4, yet another exemplary operation of system 10 is shown. When APU 80 is out of fuel, APU 80 is not used, or APU 80 is not present, first rechargeable energy source 70 can be recharged by other components of system 10 (in addition to other methods). First prime mover 20 and second prime mover 50 are preferably operated and synchronized to the same speed (e.g., input and output mechanical communication through component 40 is a one to one ratio). Component 40 is preferably engaged to transmission 30. First prime mover 20 provides power to second prime mover 50 through transmission 30 and component 40. Adjustments to the speed of second prime mover 50 speed or the speed of first prime mover 20 are made if the ratio between first prime mover 20 and second prime mover 50 is not one-to-one to minimize wear of the clutch in component 40. Operation of second prime mover 50 recharges first rechargeable energy source 70 to a predetermined level of stored energy. This method of recharging first rechargeable energy source 70 is intended to allow continuous system operation in the field without the use of external grid power in one embodiment. This method is further intended to allow continuous operation of equipment 100 during recharging of first rechargeable energy source 70 in one embodiment.

While charging first rechargeable energy source 70, second prime mover 50 simultaneously operates accessory 60. Accessory 60 provides power to on-board or external equipment 100. After first rechargeable energy source 70 has been recharged, component 40 is disengaged from transmission 30. Operation of accessory 60 can continue without the use of first prime mover 20 as shown in FIG. 2. Alternatively, with component 40 engaged, operation of accessory 60 can continue powered in part or in full by prime mover 20. This may be useful for example, if there is a failure in one of the other components that power accessory 60. This may also be useful if the power demand from accessory 60 exceeds the power available from second prime mover 50. According to one exemplary embodiment, first prime mover 20 provides supplementary power to or all of the power to equipment 100 (e.g. a digger derrick that may require higher hydraulic flow during digging operations). Using first prime mover 20 to provide supplementary power to equipment 100 during intermittent periods of high power requirement allows system 10 to include a smaller second prime mover 50 that is able to provide enough power for the majority of the equipment operation. The control system may receive a signal from the equipment indicating additional power is required beyond that provided by second prime mover 50. Such a signal may be triggered by the operator, by activation of a function (e.g., an auger release, etc.), by demand in the circuit or component above a predetermined threshold, or by other means. In a different mode of operation, second prime mover 50 might simultaneously provide power to transmission 30 and accessory 60.

In one embodiment, a vehicle embodied as a bus used to transport people in cities can be equipped with a component composed of a PTO that interfaces with transmission 30 and a split shaft PTO. The split shaft PTO also interfaces with second prime mover 50 and accessory 60. A second PTO (not a split shaft) might be used to connect accessory 60 to the split shaft PTO in one embodiment.

In one mode of operation of the bus according to an exemplary embodiment, second prime mover 50, such as an electric motor, powers component 40 which then powers accessory 60 and transmission 30, simultaneously. Since transmission 30 is coupled to first prime mover 20 (an engine powered by diesel, CNG or other fuel), transmission 30 can power first prime mover 20. Powering first prime mover 20 using energy from first rechargeable energy source 70 is intended to save fuel and may be done so that other devices attached to the first prime mover 20 also receive power (such as a power steering pump, or an air compressor for air brakes, or a 12V alternator/generator, etc.) when first prime mover 20 continues to rotate without the use of fuel. The simultaneous power to accessory 60 may be used to power a separate air-conditioning system and/or hydraulic pump for use in a wheel chair ramp on a passenger bus. When fully stationary (passenger bus in neutral with parking brake applied), prime mover 20 might be able to be stopped (no rotation or fuel consumption), the clutch in the PTO on transmission 30 is opened and second prime mover 50 can then continue to power air conditioning using energy from first rechargeable energy source 70. A D/C to D/C converter may use energy from first rechargeable energy source 70 to recharge the lower voltage systems on the bus while it is stationary with the engine off.

Figure 5:
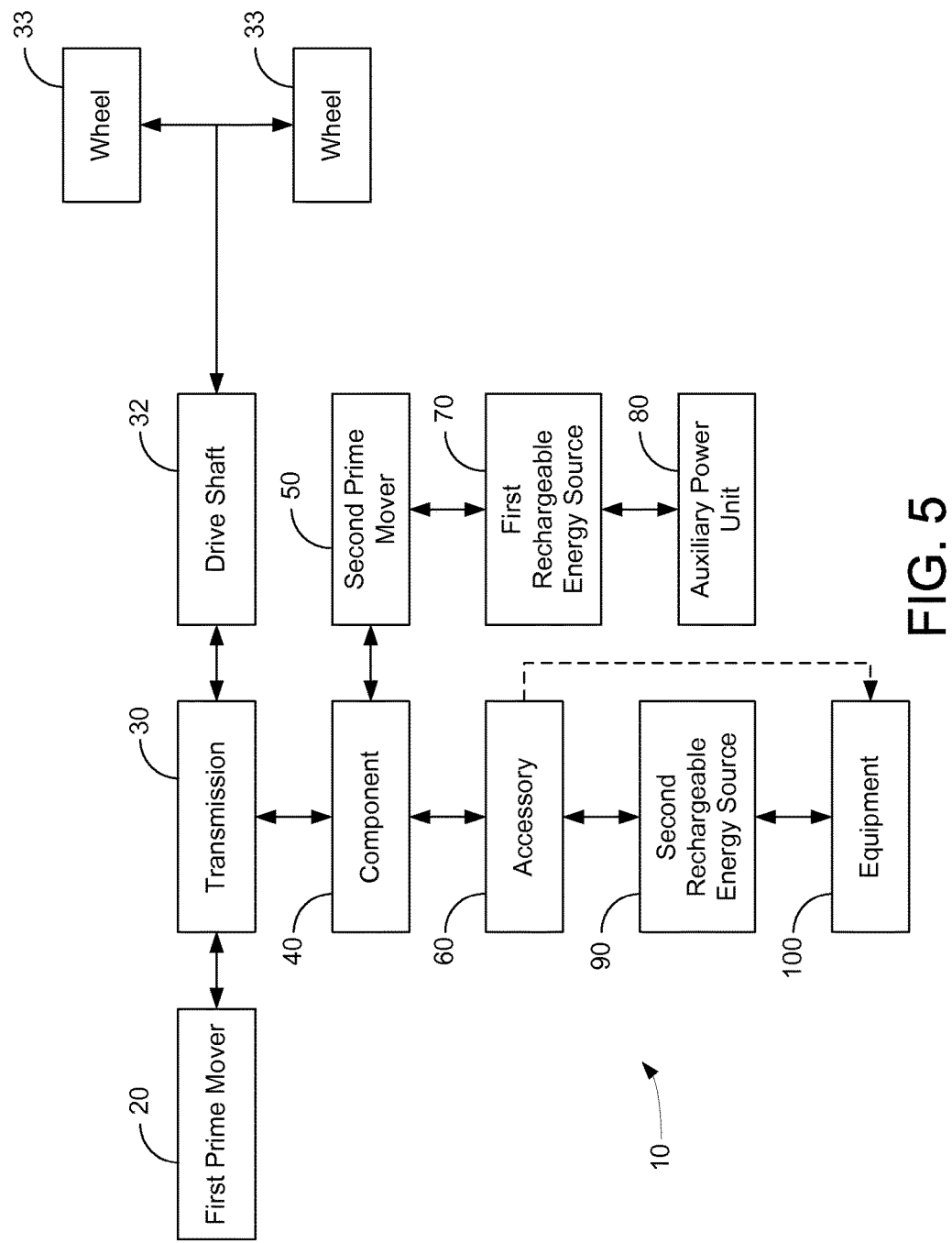
FIG. 5 is a general block diagram illustrating the operation of a hybrid vehicle drive system using a first prime mover providing power to simultaneously charge first and second rechargeable energy sources according to an exemplary embodiment.

Referring to FIG. 5, yet another exemplary operation of system 10 is shown. Second rechargeable energy source 90 is utilized. Accessory 60 provides power to second rechargeable energy source 90. In one embodiment, on-board or external equipment 100 (e.g., hydraulic cylinders, valves, booms, etc.) is coupled to second rechargeable energy source 90, and can be powered by second rechargeable energy source 90. External equipment 100 may also be operated directly by accessory 60 without the use of a second rechargeable energy source 90. This method of recharging first rechargeable energy source 70 and second rechargeable energy source 90 is intended to allow continuous system operation in the field without the use of external grid power. This method is further intended to allow continuous operation of equipment 100 during recharging of first rechargeable energy source 70 and second rechargeable energy source 90.

Figure 6:
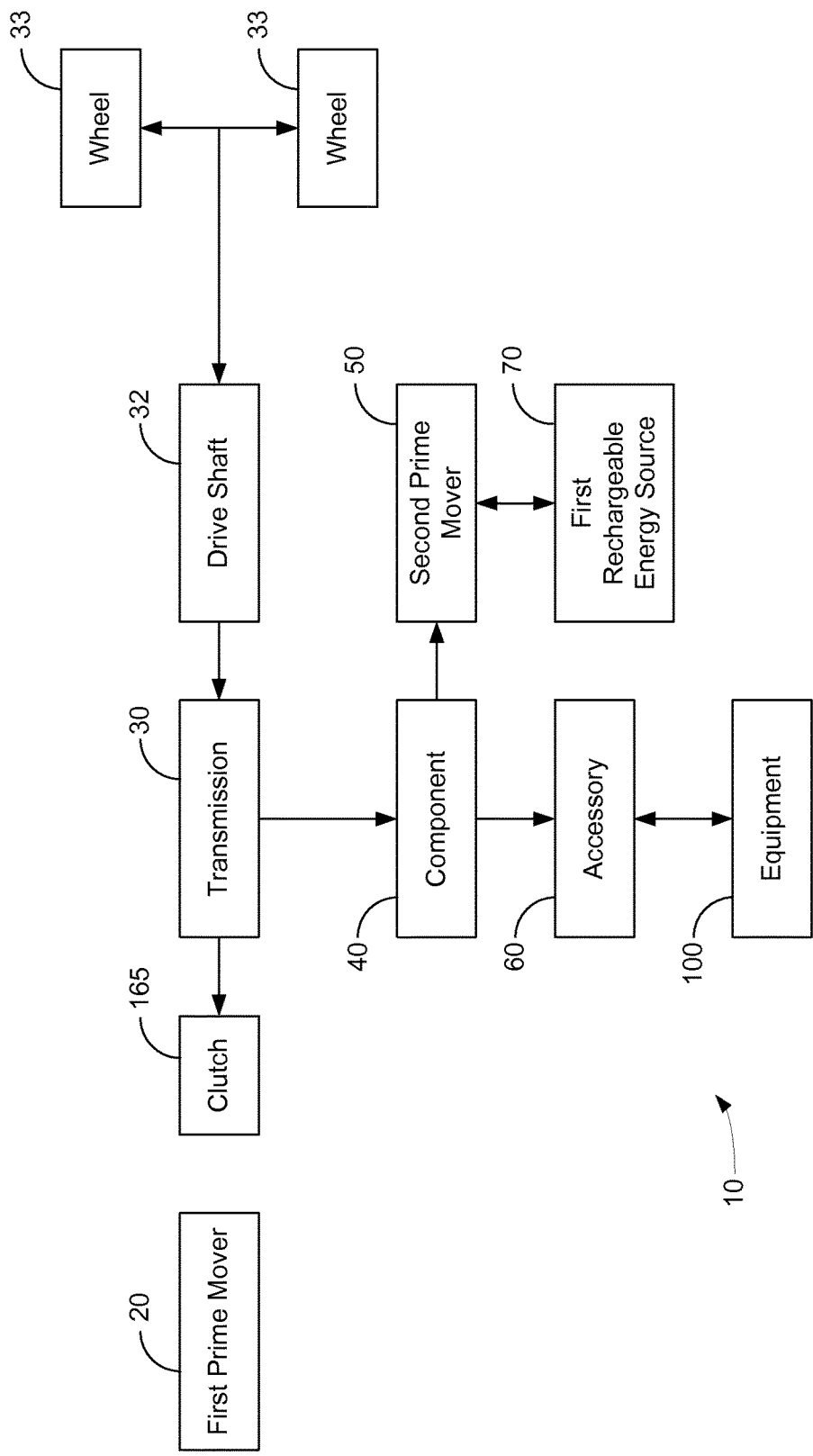
FIG. 6 is a general block diagram illustrating the operation of a hybrid vehicle drive system during regenerative braking according to an exemplary embodiment.

Referring to FIG. 6, yet another exemplary operation of system 10 is shown. In one embodiment, a clutch or other mechanism is used to disengage first prime mover 20 from transmission 30 during vehicle braking. This is intended to maximize the regenerative energy available from vehicle braking. The disengagement of the clutch during braking is optional. The forward momentum of the vehicle provides power from wheels 33 to transmission 30. Transmission 30 may be reduced to a lower gear to increase the RPMS and increase the amount of energy transferred to second prime mover 50. Second prime mover 50 can operate to charge first rechargeable energy source 70 and help slow the vehicle according to principles of regenerative braking. Disengaging first prime mover 20 from transmission 30 further reduces the amount of energy transferred back to first prime mover 20 during braking and reduces the need for engine braking. While disengaging the prime mover during braking may be desirable to transfer as much power as possible to system 10 during braking, the method is optional. Some operating methods may only disconnect the clutch during transmission shifting events. During transmission shifting events, the second prime mover may suspend regenerative braking in order to reduce the load on gears internal to the transmission during the shift, or the second prime mover may be operated to facilitate the shifting event, as an example, a transmission operating as a manual transmission or automated manual transmission may reduce the load on gears internal to the transmission during shifting events. In other embodiments the first prime mover may be directly coupled to the transmission without a clutch and may utilize an automatic transmission with a torque converter and internal gear box to transmit power to rear wheels.

As mentioned above, during vehicle braking, first rechargeable energy source 70 is charged through operation of second prime mover 50. Optionally, first rechargeable energy source 70 may be charged only when the vehicle is in motion or stopped (e.g., in a stopped position) and not braking. Charging while stationary may be especially beneficial for vehicle drive systems with an automatic transmissions in which the engine can engage the transmission but the transmission does not need to be completely uncoupled from first prime mover 20 when the vehicle is stationary and prime mover 20 continues to rotate. Not recharging the rechargeable energy source 70 during braking may be used to reduce or eliminate interaction of system 10 with the brakes provided on the vehicle. Alternatively, regenerative braking, or charging of the rechargeable energy source 70 using energy from the power train may be reduced or eliminated if an anti-lock braking signal is detected by the controller of system 10. Accessory 60 can optionally operate to further slow the vehicle, and store energy in optional second rechargeable energy source 90, if second rechargeable energy source 90 is not fully charged. In this manner, regenerative braking can be used to simultaneously charge multiple energy storage devices of system 10. This is intended to allow recharging of both energy storage devices through braking during vehicle travel, among other advantages. A clutch can be optionally included between first prime mover 20 and transmission 30 to further improve regenerative braking. In some embodiments, charging continuously occurs as vehicle of system 10 is driven.

Referring still to FIG. 6, in some embodiments having a clutch in between the first prime mover and a manual transmission, an interface may be used to allow the system 10 to directly couple with the first prime mover. The interface with the first prime mover may comprise a PTO that is configured as shown in FIG. 1B and/or FIG. 7. For example, the interface may comprise a PTO configured to connect to a gear box 53 as shown in FIG. 1B. Also, the interface may comprise a clutch shift PTO configured to communicate with the transmission and split shaft PTO as shown in FIG. 7, for example.

As has been discussed, system 10 may perform many different functions. The function of the various exemplary embodiments of system 10 may change based on the behavior of the vehicle that includes system 10. For example, when the vehicle is braking, regenerative braking may be used to recharge first rechargeable energy source 70 and/or second rechargeable energy source 90. During acceleration, first rechargeable energy source 70 and/or second rechargeable energy source 90 may be used to provide power to the drive train. When the vehicle is parked, on-board equipment 100 such as a hydraulic lift may be activated. Such a hydraulic lift would draw power from second rechargeable energy source 90 (e.g., a hydraulic accumulator) or be driven directly by an accessory 60 such as a hydraulic pump. Once the lift is raised and stops, hydraulic fluid no longer flows. In this position, second rechargeable energy source 90 does not have to be charged and accessory 60 does not have to run to keep the hydraulic lift raised. Therefore, when the lift is not moving, second prime mover 50 may be turned off to reduce unnecessary consumption of energy from first rechargeable energy source and first prime mover 20 may be turned off to reduce unnecessary idling. Prime mover 20 may remain off when the vehicle is parked if there is sufficient energy in rechargeable energy sources 70 or 90 for equipment, or "hotel loads", or power that is exported from the vehicle to power tools or lights or other loads, including but not limited to providing power for buildings or for the electric grid. If power is provided to the grid, power may be provided through a bi-directional connection allowing ancillary services to be provided by receiving and/or delivering power to the grid, such services may be related to frequency regulation intended to enhance grid stabilization. Other control of charging or export of power from system 10 may incorporate Demand Response (DR) capability. Demand Response capability is intended to reduce or stop charging during times that the grid may be under a heavy load or an individual facility could incur peak charges, related to higher use of grid electricity and higher costs for receiving the electricity. Communication to the vehicle may be through a telematics system, as an example, for demand response, a utility may send a schedule of prices of electricity over a cellular network, other wireless network or Power Line Carrier signal. System 10 controller may use control logic to determine the start of charging with the price signals sent by the electricity provider. System 10 may optionally use the first prime mover, or an auxiliary power unit, such as a fuel cell or generator, to provide additional energy to the grid during times of high peak demand. Such power may be directed to the grid directly from a generator or fuel cell without being stored in an intermediate rechargeable storage system (such as a battery), or may be provided by the battery, possibly through an additional inverter to condition and synchronize the export power for use on the electrical grid or for use with other loads requiring electrical power. System 10 may include sensors and a control system to automatically turn on and off first prime mover 20, second prime mover 50, accessory 60, or other components of system 10 when they are not needed thereby conserving fuel and reducing emissions.

With reference to FIG. 7, split shaft architecture 700 is used as component 40 in FIG. 1A and FIG. 1C according to one embodiment. Architecture 700 includes a clutch shift PTO 702, a split shaft PTO 704, and a clutch shift PTO 706. Clutch shift PTO 706 is coupled to a gear pump, or other accessory such as accessory 60. Split shaft PTO 704 has an interface 712 coupled to an electric motor such as second prime mover 50. A bracket or support 725 can be coupled to split shaft PTO 704 and to transmission 30.

Electric motor or mover 50 can be connected by a shaft or U-joint to interface 712 of split shaft PTO 704. Advantageously, clutch shift PTOs 702 and 704 can be relatively small and mounted to interfaces 722 and 724 of split shaft PTO 704. The use of architecture 700 allows final stage manufacturing to mount devices to transmission 30 as normal (no special pumps and yet allows vehicle to operate as a hybrid system) according to one embodiment. Mover 50 and accessory 60 can be arranged to face prime mover 20.

In one embodiment, split shaft PTO 704 can have a solid shaft. The solid shaft can be preferred in some applications. The solid shaft can eliminate some of the complexity and cost of the split shaft PTO. A Parker model PTO, such as a PTO from the 890/897 and 892/899 Series PTOs, with another clutch in between transmission 30 and the 890 series PTO or similar model PTO, and a gear attached to the shaft of the 890 series PTO (in between both clutches) could be used. Lubrication from transmission 30 can be used. A spline, wet or dry, could be used to connect various components. It may not be necessary to use the split shaft functionality in many applications.

In one embodiment, the split shaft architecture may be advantageous in situations in which there is improved performance or better tolerance to certain failures if second prime mover 50 is de-coupled from the system. Second prime mover 50 often may be an electric motor or separate hydraulic motor with rechargeable energy source 70 (a battery, super-capacitor, or other electro-chemical energy storage system for an electric motor, or a fluid accumulator for a hydraulic or air pump).

System 10 can operate architecture 700 in various modes controlled by a control system. During a drive mode, clutch shift PTO 702 is engaged with transmission 30 and split shaft PTO 704 is engaged with mover 50 in one embodiment. Clutch shift PTO 706 is disengaged during the drive mode so accessory 60 does not turn. During a work site all-electric PTO mode (ePTO mode), clutch shift PTO 702 is disengaged from transmission 30 and split shaft PTO 704 is engaged with mover 50 in one embodiment. Clutch shift PTO 706 is engaged so accessory 60 turns as needed, using power from second prime mover 50. Such a mode of operation is intended to reduce fuel use, reduce harmful emissions and provide a quieter work site. The reduction of engine noise can allow easier communication, potentially improving safety and productivity at a work site or emergency rescue site. The reduced work site noise may also allow extended hours of operation in areas with noise limitations during certain periods. In a work site charging mode, which may be needed if one or more rechargeable energy sources deplete stored energy below a threshold, with accessory 60 disengaged, prime mover 20 is operating and clutch shift PTO 702 is engaged with transmission 30. Split shaft PTO 704 is engaged with mover 50 as mover 50 operates as a generator to charge first rechargeable energy source 70. Clutch shift PTO 706 is disengaged so that accessory 60 does not turn. Such a mode may be advantageous when first rechargeable energy source 70 needs to be recharged, but there is no need to operate equipment that receives power from accessory 60. An example is a truck at a work site operating electrically powered HVAC and/or electric tools drawing power from rechargeable energy source 70, potentially using a separate inverter to convert DC battery power to AC 110 V or 220 V, with first prime mover 20 off.

In a work site charging mode with accessory 60 engaged, potentially providing power for equipment or air conditioning, prime mover 20 is operating and clutch shift PTO 702 is engaged with transmission 30. Split shaft PTO 704 is engaged with mover 50 as mover 50 operates as a generator to charge first rechargeable energy source 70. Clutch shift PTO 706 is engaged so that accessory receives power, and may rotate. This mode allows charging while continuing to power accessories, equipment, air conditioning and/or other loads. First prime mover 20 may be operated so that there is no change in the output rpm of clutch shift PTO 706 to accessory 60 in comparison to the output rpm before first prime mover 20 is used in the charging mode.

In an all-electric drive mode associated with electric motor operation during driving, clutch shift PTO 706 is disengaged from split shaft PTO 704 and transmission 30 is disengaged from prime mover 20 by a clutch between transmission 30 and mover 20 or a clutch within transmission 30 in one embodiment. Mover 50 provides power through transmission 30 to drive shaft 32. In a work site mode without the electric motor engaged, first prime mover 20 is operating, clutch shift PTO 702 is engaged with transmission 30, and split shaft PTO 704 is disengaged with mover 50 according to one embodiment. Mover 50 does not turn. Second clutch shift PTO 706 is engaged so that accessory 60 rotates under power from mover 20.

In one embodiment, the order or position of accessory 60 and mover 50 can be reversed. Mover 50 can also be disposed on a bottom, or use a shaft to PTO 704 and have pump off of the back.

The shaft can be enclosed to limit access to moving parts as an option associate with the split shaft architecture. The architecture can be housed in the housing of transmission 30. A transfer case with a PTO configuration can be used, such as those manufactured by Kenworth.

In one embodiment, split shaft architecture 700 might have a gear and pinion to multiply speed for use with faster spinning pump. Typically an air valve is used to engage the PTO, but a mechanical linkage, electric or hydraulic mechanism are also options. Shaft may incorporate shafts of various lengths, including but not limited to stub shafts that may have splines.

In addition, system 10 may utilize a work site charging mode with accessory 60 not engaged which may be useful for charging first rechargeable power source 70 if the vehicle is in neutral with the key on. Such a mode can include an automatic shutdown operation used to save fuel. The shutdown operation automatically shuts down after a predetermined amount of time or when certain charge level is reached in rechargeable energy source 70. In one embodiment, vehicle 10 has an ePTO button in the cab or elsewhere, and if the ePTO button is not depressed, the work site charging mode with accessory 60 not engaged can be utilized to charge first rechargeable power source 70 and automatically turn off when a charging level is reached. This mode is only operational as long as the ignition key is on and the vehicle is in park or neutral with the parking brake on in one embodiment.

In one embodiment, clutch shift PTO 702 can have a gear ratio that rotates mover 50 faster than engine RPMs of mover 20 which provides a better operating RPM range for mover 50. Alternatively, split shaft PTO 704 can be arranged to have such a gear ratio.

In one embodiment, clutch shift PTO 706 has a ratio best suited for accessory 60 or the pump (e.g., less than 100 percent) so that RPM output to accessory 60 is at a one-to-one ratio with the RPM of prime mover 20.

According to an alternative embodiment, a third PTO can be mounted at interface 702 that is set at yet a higher PTO output percentage for mover 50. The optional third PTO can be a clutch shift PTO and allow for even higher RPM ratio in comparison to the RPM of prime mover 20. Muncie Power split shaft assemblies could be configured to be used in system 10 according to one embodiment. A gear box output attached to output of Parker Chelsea 890/891/892 or other series could be used. PTO with similar characteristics such as 897/898/899 Series can be used in system 10 according to one embodiment.

In a different mode of operation, second prime mover 50 might simultaneously provide power to transmission 30 and the accessory 60. Second prime mover 50, such as an electric motor, powers component 40 which then powers accessory 60 and transmission 30 simultaneously.

Due to tight clearance between transmission 30 and other components on a truck or truck frame, it may be necessary to use geared adapters, such as but not limited to Parker 630 or 645 series in one embodiment.

A control system incorporating electric overspeed control may also be used to limit the input speed to an accessory, motor or other component mounted to a device with a clutch, such as a split shaft PTO or "hot shift" PTO. The PTO may incorporate "wet spline" to reduce wear on the spline by lubricating spline in one embodiment.

Various PTOs can be used. A transmission may have multiple openings for PTOs to be mounted to transmission 30. Dual output PTOs, such as Parker Series 452, 630, 645, 897, 898 or 899 PTOs can be utilized.

The addition of the clutch PTO 702 mounted from split shaft PTO 704 allows for the same pump to be used in a retrofit saving money on a new pump and possible redesign of hydraulics. The pump may be direct mounted to PTO 706 or optionally could use a drive line to a pump or other accessory mounted further behind transmission 30. The gear pump might be mounted to face other direction mounted towards the front of the vehicle depending on packaging available.

Figure 9:
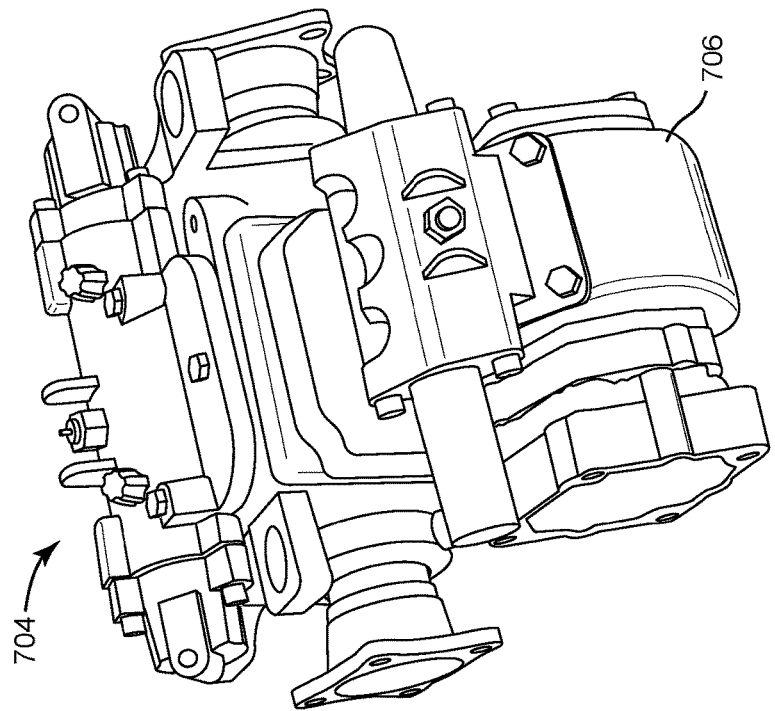
FIG. 9 is a perspective view schematic illustration of the split shaft PTO illustrated in FIG. 8 attached to a clutch shift PTO according to another exemplary embodiment.
Figure 8:
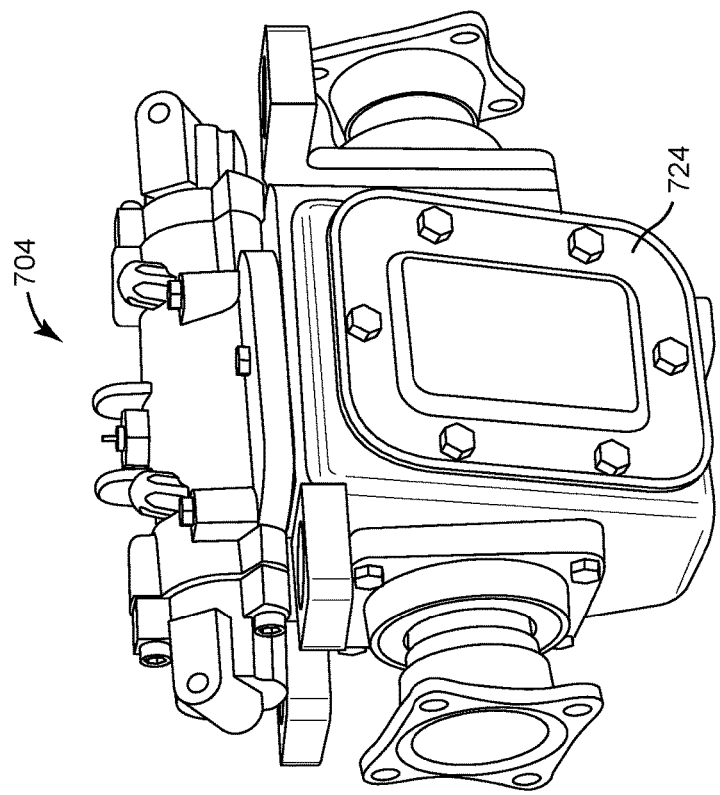
FIG. 8 is perspective view schematic illustration of a split shaft PTO for the split shaft PTO architecture illustrated in FIG. 7 according to another exemplary embodiment.

With reference to FIG. 8, a split shaft PTO 704 can be a split shaft PTO manufactured by Chelsea. FIG. 9 shows split shift PTO with a clutch shift PTO 706 attached thereto. In one embodiment, PTO 704 and PTO 706 are manufactured by Chelsea. However, various split shaft PTO and clutch shift PTO devices can be utilized. Although specific configurations of split shaft PTOs and clutch shift PTOs are described, other configurations can be utilized without departing from the scope of the claims. In one alternative embodiment, split shaft PTO 704 may be coupled to non-PTO interfaces which are described in U.S. Provisional Application No. 61/624,118 incorporated herein by reference in its entirety.

Figure 10:
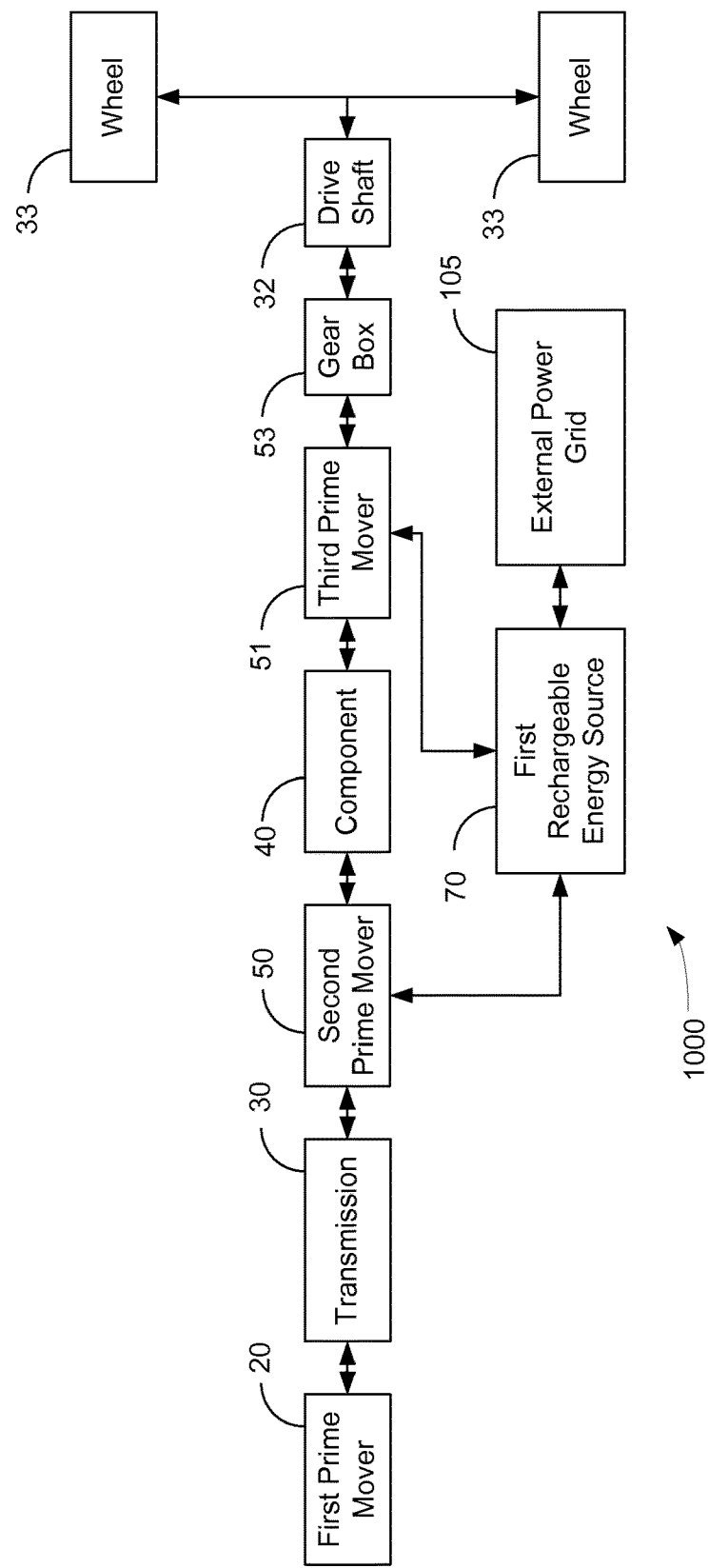
FIG. 10 is a general block diagram illustrating vehicle hybrid system using a split shaft component architecture according to another exemplary embodiment.

With reference to FIG. 10, a vehicle hybrid system 1000 for a vehicle includes first prime mover 20, transmission 30, second prime mover 50, component 40, third prime mover 51, gear box 50, drive shaft 32 and wheels 33. Vehicle 1000 has a series hybrid configuration and can include a first rechargeable energy source 70 coupled to second prime mover 50. An external grid 105 can be coupled to first rechargeable energy source 70.

Prime mover 20 can be any type of engine including diesel, gasoline, CNG, propane NOG, biofuel, etc. Transmission 30 can be an automatic, semi-automatic, CVT, etc. Prime mover 50 can be a hydraulic motor, electric machine, etc.

Component 40 can be configured as a split-shaft system in one embodiment. Component 40 is provided between second prime mover 50 and third prime mover 51. Third prime mover 51 can be similar to prime mover 50 and is coupled to gear box 53 which is coupled to drive shaft 32 which is coupled to an axle connected to wheels 33.

Figure 11:
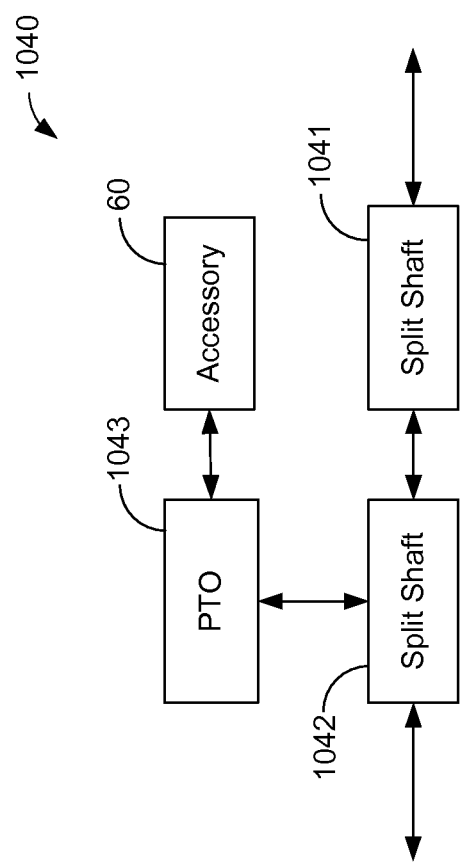
FIG. 11 is a general block diagram illustrating a split shaft component for the vehicle hybrid system illustrated in FIG. 10 according to another exemplary embodiment.

With reference to FIG. 11, a component system 1040 including a split shaft PTO 1042 coupled to prime mover 50 and a split shaft PTO 1041 coupled to third prime mover 51 can be provided as component 40. Split shift 1042 can also be coupled to a PTO 1043 which is coupled to an accessory 60. PTO 1043 can be optional and one of split shaft 1042 or 1041 can also be optional.

In a series hybrid operation, split shaft PTO 1042 can be uncoupled from split shaft PTO 1041, and prime mover 51 can be used as a motor to propel vehicle or used for regenerative braking in charging a first rechargeable energy source 70. In a hybrid operation, split shaft 1042 and split shaft 1041 can be connected so that power from prime mover 50 or prime mover 20 can be provided to wheels 33. One or both of prime movers 50 and 51 can provide propulsion or regenerative braking, thereby providing redundancy in case of a malfunction. In an all-electric mode, split shaft PTOs 1042 and 1041 can remain open and transmission 30 can be provided power with prime mover 20 off and prime mover 50 can be utilized to operate PTO 1043 and accessory 60 without driving shaft 32 to wheels 33. In a stationary charge mode, split shaft PTOs 1042 and 1041 can remain open. Transmission 30 can be in gear with the engine moving and operating PTO 1043 through split shaft PTO 1042. In this way, accessory 60 can be driven via mechanical connection without moving drive shaft 32 or wheels 33 while charging source 70.

Figure 12:
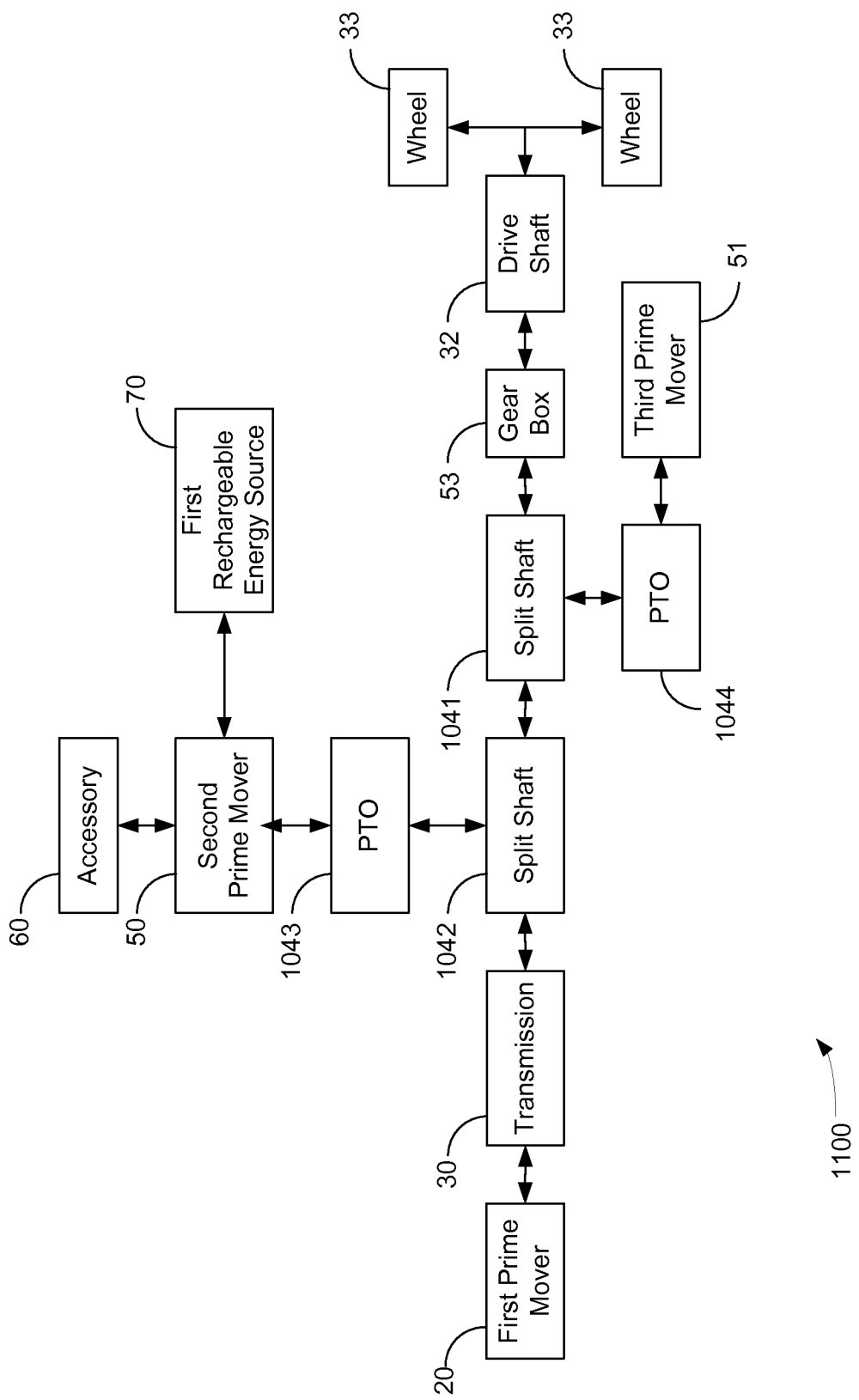
FIG. 12 is a general block diagram illustrating a vehicle hybrid system using a split shaft component architecture according to another exemplary embodiment.

With reference to FIG. 12, a hybrid drive system 1100 for a vehicle includes a first prime mover 20, a transmission 70 and a component comprised of a split shaft PTO 1042 and a split shaft PTO 1041. The component is a split shaft PTO configuration. Split shaft 1042 is coupled to PTO 1043 and split shaft PTO 1041. Split shaft PTO 1041 is coupled to PTO 1044 and gear box 53. PTO 1043 is coupled to second prime mover 50 which is coupled to accessory 60 and first rechargeable energy source 70. Source 70 can also be coupled to the external grid and third prime mover 51. PTO 1044 is coupled to third prime mover 51. System 1100 can operate in a series hybrid mode when split shafts PTOs 1042 and 1041 are not connected. In such a mode, mover 50 can operate as a generator being driven by transmission 30 and prime mover 20. Prime mover 51 can be used as motor which propels the vehicle via PTO 1044 and split shaft PTO 1041. An optional shaft can be provided between PTO 1043 and mover 50 as well as between PTO 1043 and mover 51. Gear box 53 is optional and can be used to provide a change in speed ratio of shaft 32. Energy from regenerative breaking provided by mover 51 and 50 can be stored in energy source 70.

In a parallel hybrid mode of operation, split shafts PTOs 1040 and 1041 are connected and power can be transmitted from transmission 30 to wheels 33. One or both of movers 50 and 51 can provide propulsion or regenerative braking. In a stationary all-electric mode, split shaft PTOs 1041 and 1042 and PTO 1043 can have a clutch which is disconnected from mover 50. Mover 50 can drive accessory 60 without driving other portions of the vehicle. In a stationary charge mode, split shafts PTOs 1042 and 1041 are open or disconnected and transmission 30 can provide power via mover 20 through PTO 1043 with a clutch engaged so that mover 50 generates electricity for storage in source 70 and can also move accessory 60 without driving gear box 53 or drive shaft 32. Advantageously, system 1100 can utilize electric motors for prime movers 50 and 51.

The split shaft architecture advantageously allows various motors to be selected, including end shaft electric motors. Electric motor failures requiring the motors to be kept stationary after a failure can be more simply by-passed when compared to through-shaft electric motor architectures in which the electric motor may mounted on the axis of a drive shaft. Similarly, split shaft architectures can use independent hydraulic or electric motors with less parasitic losses.

The split-shaft PTO can be used on vehicle and inserted between two sections of drive shaft 32. If used between two sections of the drive shaft 32, the split shaft might be installed with a u-joint on each side of the individual sections of driveshaft 32 according to one embodiment. In such a configuration, another PTO connected to the split shaft PTO could be used to couple second prime mover 50 directly to the drive-shaft. An advantage of that embodiment is that an end mount electric motor could be used in a post-transmission hybrid and above certain shaft speeds the electric motor could be disconnected by a clutch in the second PTO. There could be gearing between, or within the coupling of the split-shaft PTO to the second PTO connected to the split-shaft PTO. The gearing could permit more efficient operation by better matching the optimal RPM of the electric motor to that of the driveshaft 32 RPM.

In one embodiment, a retarder is used with the hybrid systems 10, 1000, or 1100. The retarder has a direct output through a hydraulic pump that is connected to an electric motor. The retarder can be an Allison hydraulic retarder in one embodiment. If electric motor or prime mover 50 cannot absorb enough power, the retarder functionality can augment absorption. A retarder might absorb 600 HP of braking force at 50 mph, far more than most typical electric motors that are utilized on hybrid medium and heavy duty motors.

In one embodiment, the electric motor is combined with the retarder. Such a configuration can be useful for transit applications and others where a retarder is already installed. Using the electric motor up to its allowable power limit as a generator, which helps to slow the vehicle, and using a retarder to convert remaining kinetic energy into heat through the transmission ensures appropriate slowing of the vehicle with less brake wear. A control system monitors the available power for slowing the vehicle and combines the use of both systems if braking power exceeds the power available from the electric motor of a hybrid system.

Figure 13:
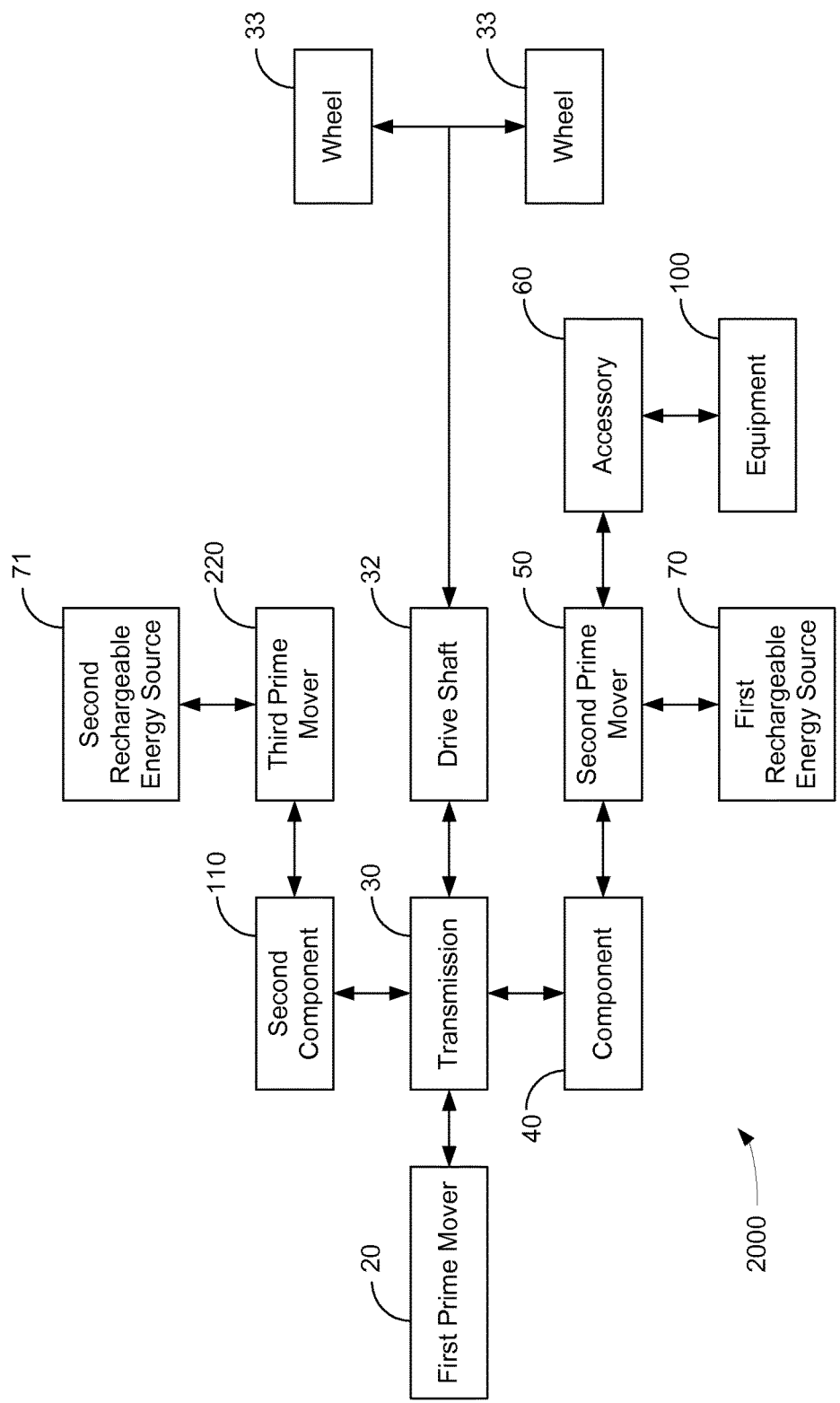
FIG. 13 is a general block diagram of a vehicle drive system according to an exemplary embodiment.

In one embodiment, an all-electric propulsion system on a vehicle can be provided using a system of FIG. 19 in U.S. Pat. No. 8,408,341 or system 2000 illustrated in FIG. 13 with a non-hybrid powertrain by upgrading the powertrain to a hybrid using two PTO's to power drive shaft 32. In some embodiments, the transmission 30 of FIG. 13, for example, is coupled to an optional split shaft. The optional split shaft can communicate with the second prime mover 50. In another embodiment, the component 40 of FIG. 13 can be optionally replaced with the configuration in FIG. 4 or FIG. 1A. For example, the component (e.g., a split shaft) may communicate with the second prime mover 50 and the accessory 60.

On an Allison 3000 or 4000 series transmission or other transmission, two PTO's or components 40 and 110 can be attached to transmission 30 in two different locations (example, one on each side of transmission 30) which would interface with a single PTO gear that is internal to transmission 30 and attached to the pump section of automatic transmission 30 in one embodiment. The pump section is part of the torque converter in transmission 30 and is also coupled directly to the first prime mover 20 (typically CNG, diesel or other powered internal combustion engine). In one embodiment, there is typically not a clutch between automatic transmission 30 and the first prime mover, although there technically could be one. Other transmissions could be used. The ability to couple the second and third prime movers 50 and 220 to crank or drive shaft 32 of first prime mover directly or indirectly is provided in one embodiment.

While a single rechargeable source 70 could be used as disclosed in other patent applications incorporated herein by reference to provide power to both second and third prime movers 50 and 220 (electric motor/generators), two relatively independent systems 70 and 71 for each of the second and third prime movers 50 and 220 can be used. A modular system offers benefits of fault tolerance and the potential to better match the battery system characteristics (power, energy storage) for each of the second and third prime movers.

The system 2000 can have one or two control systems. If there are two, each control system would operate its own electric motor and associated power electronics, rechargeable energy source and other options such as grid recharging, optional APU, optional exportable power (replaces a generator with combustion engine), HVAC for climate control with the engine off in one embodiment.

Cranking prime mover 20 with the engine not using fuel (the engine not using fuel due to either a discrete command to the engine control module or as a function of "bumping" the idle) can be used by system 2000. If one system were to malfunction, having two independent systems can increase fault tolerance by allowing the malfunctioning system to be shut down and the other system providing some propulsion while the vehicle moves off of the road, or the first prime mover is started to provide propulsion.

Rechargeable energy system 70 and 71 can be a battery system, such as a single battery, multiple batteries, or multiple battery modules (each module containing one or more battery cells in series and/or parallel) configured in series and/or parallel. In one embodiment, two 14 kWh modules in parallel provides power to a single motor (e.g., mover 50 or mover 220) through an inverter.

As an example, a dual motor hybrid might be composed of two 14 kWh packs in parallel for one system providing energy and power for one motor, potentially also having related power electronics such as the individual system's own inverter, controller, optional DC/DC converter for low voltage charging (e.g., charge 12 or 24V bus), optional on board battery charger for conversion of grid energy to energy for recharging battery.

The second system (e.g., mover 220 and system 71) on the truck may use the same components but only to power the second motor. The advantage is that if there were a fault, such as an open circuit or fault detected from a high voltage interlock loop, then only the system with the fault could be shut-down. The other system which is isolated from the system with the fault could continue to operate. Each system can monitor the other, such that if a fault or other problem is detected in the other system, the system without the fault may boost output to compensate for the loss of power from one motor.

The motors may be controlled, as explained in the patent applications incorporated herein by reference, so the torque ratings, rpm and other limiting factors of components that are powered are not exceeded. The two motors may be operated in such a way, that combined torque into the transmission does not cause the turbine section of transmission 30 or other component in transmission 30 to be exceeded. The input torque of the motor or engine, such as first prime mover 20, maybe included if it is providing power (summed with the input torque into transmission 30 from the two motors). If first prime mover 20 is not powered by fuel, but is instead being rotated by one or more of the second or third or additional prime movers 50 and 220, then the torque calculated to be input in the turbine section of transmission 30 can be adjusted to account for torque used to rotate the prime mover 20 (including any accessories, such as FEAD, attached to the first prime mover). Torque multiplication of torque converter may also have to be taken into account if the torque converter is not locked-up.

The two motors or movers 50 and 220 may also be operated such that each individual input torque through each PTO to transmission 30 is not exceeded and they may also be operated so that the sum of both the inputs do not exceed the ratings of the PTO gear internal to transmission 30.

If first prime mover 20 is commanded to be off (or made to be off by stopping fuel flow), but is being rotated to provide power for accessories and to allow power to be transferred to transmission 30, the speed of first prime mover rotation when powered by other prime movers 50 and 220 may be higher or lower than the idle set-point. Since combustion is not taking place, it may be possible to provide a sufficient power to accessories connected to first prime mover 20 at a lower rpm than used when the engine idles in one embodiment. Other features, such as, reduced engine load at stop (RELS) which places the front section of transmission 30 in neutral or other more easily rotated mode, while potentially locking or inhibiting the driveshaft output to the wheels from moving (such as during the drive mode when the vehicle is stopped at a stop light or bus stop), may be used in one embodiment.

Through shaft motor, end mount motor and use of split-shaft PTO may be used in one or both of the two separate hybrid systems attached to transmission 30.

It is also important to note that the arrangement of the hybrid drive system components, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Further, the discussions related to optional coupling, shafts, clutches and clutch shift PTOs apply to other embodiments described with respect to other Figures and shown in the applications incorporated herein by reference. For example, although an APU 80 and optional clutches are shown in various embodiments, they can be removed from the system without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A vehicle drive system for a vehicle including a first prime mover, a first prime mover driven transmission, and a rechargeable energy source, the vehicle drive system comprising:
   a power take-off (PTO) connected to the first prime mover configured to rotate a PTO interface at a first speed;
   a gear box connected to the PTO at the PTO interface and configured to rotate at a second speed at an upper output interface when the PTO interface rotates at the first speed, wherein the second speed is higher than the first speed; and
   an electric motor in direct or indirect mechanical communication with the first prime mover driven transmission through the PTO and the gear box, wherein the electric motor can receive power from the first prime mover driven transmission via the upper output interface of the gear box.

2. The vehicle drive system of claim 1, further comprising:
   a fluid motor in direct or indirect mechanical communication with a lower output interface of the gear box, the fluid motor being powered by rotation of the electric motor via the gear box.

3. The vehicle drive system of claim 2, wherein the fluid motor can be rotated using the power from the first prime mover via the lower output interface of the gear box.

4. The vehicle drive system of claim 3, wherein the upper output interface of the gear box has a higher rotational speed compared to the lower output interface of the gear box.

5. The vehicle drive system of claim 1, wherein the upper output interface of the gear box has a higher rotational speed compared to the first prime mover.

6. The vehicle drive system of claim 2, wherein the lower output interface of the gear box is rotated with the first speed.

7. The vehicle drive system of claim 6, wherein the lower output interface of the gear box has a lower rotational speed compared to the first prime mover.

8. The vehicle drive system of claim 2, wherein the upper output interface and the lower output interface of the gear box have higher rotational speeds compared to an input of the gear box.

9. The vehicle drive system of claim 2, further comprising:
   a clutch between the lower output interface of the gear box and the fluid motor.

10. The vehicle drive system of claim 2, wherein the fluid motor comprises a fluid pump.

11. A vehicle drive system, comprising:
    a first prime mover,
    a first prime mover driven transmission coupled to the first prime mover;
    a rechargeable energy source;
    an electric motor; and
    a component comprising a power take-off coupled to the first prime mover driven transmission and a gear box, wherein the gear box is configured to output at a first interface and input at a second interface connected to the PTO, wherein the first prime mover is configured to rotate the second interface at a first speed via the first prime mover driven transmission and the gear box is configured to rotate the first interface at a second speed when the second interface rotates at the first speed, wherein the second speed is higher than the first speed, wherein the electric motor is coupled to the first interface of the gear box.

12. The vehicle drive system of claim 11, further comprising:
    a fluid motor in direct or indirect mechanical communication with a third interface of the gear box.

13. The vehicle drive system of claim 12, wherein the fluid motor can be rotated using power from the first prime mover via the first interface of the gear box or the second interface of the gear box, wherein the first interface of the gear box has a higher rotational speed compared to the third interface of the gear box.

* * * * *